US011338433B2

(12) United States Patent
Morey et al.

(10) Patent No.: US 11,338,433 B2
(45) Date of Patent: May 24, 2022

(54) MODULAR ROBOT DESIGN

(71) Applicant: X Development LLC, Mountain View, CA (US)

(72) Inventors: Christopher Morey, Oakland, CA (US); Robert Wilson, Mountain View, CA (US); Jonathan Souliere, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 117 days.

(21) Appl. No.: 16/531,953

(22) Filed: Aug. 5, 2019

(65) Prior Publication Data
US 2019/0351548 A1 Nov. 21, 2019

Related U.S. Application Data

(63) Continuation of application No. 15/345,508, filed on Nov. 7, 2016, now Pat. No. 10,414,046.

(51) Int. Cl.
G05B 19/418 (2006.01)
B25J 9/16 (2006.01)
(Continued)

(52) U.S. Cl.
CPC ............ B25J 9/1617 (2013.01); B25J 9/08 (2013.01); B25J 9/1661 (2013.01); B25J 19/007 (2013.01);
(Continued)

(58) Field of Classification Search
CPC . B25J 9/1617; B25J 9/08; B25J 9/1661; B25J 9/1605; G05B 2219/40302;
(Continued)

(56) References Cited

U.S. PATENT DOCUMENTS 8,135,567 B2 3/2012 Walacavage et al.
8,146,053 B2 3/2012 Morrow et al.
(Continued)

FOREIGN PATENT DOCUMENTS

WO 2006/043873 A1 4/2006
WO 2010/071384 A2 6/2010
WO 2015/116273 A1 8/2015

OTHER PUBLICATIONS

M. Mohammed et al., "A New Algorithm for Measuring and Optimizing the Manipulability Index", International Journal of Advanced Robotic Systems, Jun. 2009, pp. 145-150, vol. 6, No. 2.
(Continued)

Primary Examiner — Bao Long T Nguyen
(74) Attorney, Agent, or Firm — McDonnell Boehnen Hulbert & Berghoff LLP

(57) ABSTRACT

Systems and methods related to providing configurations of robotic devices are provided. A computing device can receive a configuration request for a robotic device including environmental information and task information for tasks requested to be performed by the robotic device in an environment. The computing device can determine task-associated regions in the environment. A task-associated region for a given task can include a region of the environment that the robotic device is expected to reach while performing the given task. Based at least on the task-associated regions, the computing device can determine respective dimensions of components of the robotic device and an arrangement for assembling the components into the robotic device so that the robotic device is configured to perform at least one task in the environment. The computing device can provide a configuration that includes the respectively determined dimensions and the determined arrangement.

19 Claims, 21 Drawing Sheets

(51) Int. Cl.
  *B25J 9/08* (2006.01)
  *B25J 19/00* (2006.01)
(52) U.S. Cl.
  CPC ....... *G05B 19/41845* (2013.01); *Y10S 901/02* (2013.01)
(58) Field of Classification Search
  CPC .... G05B 2219/40304; G05B 19/41845; G05B 2219/39386; G05B 2219/40274; G05B 2219/40099; Y10S 901/02
  USPC ............................................. 700/245; 901/2
  See application file for complete search history.

(56) References Cited

U.S. PATENT DOCUMENTS

| | | | |
|---|---|---|---|
| 9,465,384 | B1 | 10/2016 | Jain et al. |
| 10,414,046 | B1* | 9/2019 | Morey ................... B25J 9/1617 |
| 2009/0037024 | A1 | 2/2009 | Jamieson et al. |
| 2009/0043543 | A1 | 2/2009 | Durney et al. |
| 2009/0265036 | A1 | 10/2009 | Jamieson et al. |
| 2013/0255426 | A1* | 10/2013 | Kassow ................... B25J 18/00 |
| | | | 74/490.03 |
| 2013/0261796 | A1 | 10/2013 | Park et al. |
| 2013/0275091 | A1 | 10/2013 | Peterson et al. |
| 2015/0298318 | A1 | 10/2015 | Wang et al. |
| 2016/0016321 | A1 | 1/2016 | Rus et al. |
| 2016/0040657 | A1 | 2/2016 | Felton et al. |
| 2016/0176043 | A1 | 6/2016 | Mishra et al. |
| 2017/0174300 | A1* | 6/2017 | Moreno ............... G05D 1/0875 |

OTHER PUBLICATIONS

National Instruments, "Overview of the LabVIEW Robotics Simulator", Dec. 22, 2015, available via the Internet at www.ni.com/white-paper/14133/en/ (last visited Jun. 28, 2016).

National Instruments, "Robot Simulation Model Builder", Jun. 2014, available via the Internet at //zone.ni.com/reference/en-XX/help/372983F-01/lvrobodialog/robo_model_builder/ (last visited Jun. 28, 2016).

H. Nguyen et al., "ROS Commander (ROSCo): Behavior Creation for Home Robots", May 6, 2013, 2013 IEEE International Conference on Robotics and Automation (ICRA), pp. 467-474.

F. Poppa et al., "RobotUI—A Software Architecture for Modular Robotics User Interface Frameworks", Oct. 2012, available via the Internet at www.transit-port.net/ftp/Publications/2012/Poppa.12.Robot_UI.pdf (last visited Jun. 30, 2016).

Robotics Bible, "Robot Links and Joints", Sep. 21, 2011, available via the Internet at www.roboticsbible.com/robot-links-and-joints.html (last visited Jul. 11, 2016).

N. Vahrenkamp et al., "Manipulability Analysis", Nov. 29, 2012, 2012 12th IEEE-RAS International Conference on Humanoid Robots, pp. 568-573.

N. Vahrenkamp et al., "Robot Placement based on Reachability Inversion", May 6, 2013, 2013 IEEE International Conference on Robotics and Automation (ICRA), pp. 1970-1975.

Wikimedia Foundation, "Serial Manipulator", Feb. 24, 2016, available via the Internet at en.wikipedia.org/w/index.php?title=Serial_manipulator&oldid=706626520 (last visited Jun. 28, 2016).

Wikimedia Foundation, "Serial Robot", Jun. 24, 2016, available via the Internet at en.wikipedia.org/w/index.php?title=Serial_robot&oldid=726773531 (last visited Jul. 13, 2016).

F. Zacharias et al., "The Capability Map: A Tool for Reasoning in Mobile Manipulation", Jul. 12, 2010, Workshop: Representations for object grasping and manipulation in single and dual arm tasks, available via the internet at www.csc.kth.se/~danik/RSS/rssAbstract.pdf (last visited Nov. 21, 2016).

Fukuda-Nakagawa 1988_Article_ApproachToTheDynamicallyReconf.pdf (Toshio Fukuda and Seiya Nakagawa, Approach to the Dynamically Reconfigurable Robotic System, 1988, Journal of Intelligent and Robotic Systems 1 (1988) 55-72) (Year: 1988).

* cited by examiner

Computing Device 110

Robot Ordering System 120

2. Where is your robot going to be inside the home?

- ☒ Kitchen
- ☐ Bathroom
- ☒ Bedrooms
- ☒ Living room / dining room / hallways
- ☐ Garage Environment Sub-Selections 210

Environment Sub-Selection Window 200

Previous 212

Next 124

Clear 126

Cancel 128

System Bar 132

FIG. 2

Computing Device 110

Robot Ordering System 120

3. What is your robot going to do inside the home?

- ☒ Vacuum floors
- ☐ Sweep / mop floors
- ☒ Clean counters / work surfaces
- ☒ Move objects
- ☐ Home safety / monitoring Task Selections 310

Task Selection Window 300

Previous 212     Next 124     Clear 126

Cancel 128

System Bar 132

FIG. 3A

Computing Device 110

Robot Ordering System 120

5. Can you give us some more information about your robot?

How much weight should the robot be able to carry?
○ At least 10 lbs.
● At least 20 lbs.
○ At least 50 lbs.
○ At least 100 lbs.
○ At least 200 lbs.

} Weight Parameter Selector 510

What is the longest horizontal reach your robot has to make?
○ 0 inches (no reach at all)
○ 24 inches (reach across a small / medium size table)
● 36 inches (reach to back of a standard counter)

} Horizontal Reach Parameter Selector 520

Parameter Selection Window 500

Previous 212

Cancel 128

Send Request 530

Clear 126

System Bar 132

Computing Device 110

Robot Ordering System 120

Comparison Window 700     Robot Comparison – Page 1 of 2  710

| | | | | |
|---|---|---|---|---|
| ☐ | 1 $x | Reach 6", 18", 30"<br>Weight 34 lbs<br>42"(H)x43"(W)x15"(D) | In stock | 1 B100 mobile base<br>1 L1 link, 1 L2 link, and 1 L3 link<br>1 J1 joint and 1 J2 joint<br>1 6-DOF gripper G1 |
| ☐ | 2 $y | Reach 8"-28"<br>Weight 44 lbs.<br>46"(H)x40"(W)x20"(D) | In stock | 1 B220 mobile base<br>2 links – 1 L4 and 1 L5<br>1 J1 joint, 1 J3 joint, and 1 S1 slide<br>1 6-DOF gripper G2 |
| ☐ | 3 $z | Reach 8"-44"<br>Weight 62 lbs<br>46"(H)x43"(W)x23"(D) | 1-2 weeks | 1 B300 mobile base<br>2 links – 1 L1 and 1 L5a<br>1 J1 joint, 1 J4 joint, and 1 S2 slide<br>1 6-DOF gripper G1 |

| Previous 212 | Next 124 | Cancel 128 |
|---|---|---|
| Customize 650 | Change Request 632 | Order Robot 640 |

System Bar 132

FIG. 7

Robot Ordering System 120

Robot Comparison – Page 2 of 2  810

| | | |
|---|---|---|
| ☐ | 1  $x | Vacuum floors – No<br>Clean counters / work surfaces – Yes<br>Move objects (20 lbs) – Yes. |
| ☐ | 2  $y | Vacuum floors – Yes<br>Clean counters / work surfaces – Yes<br>Move objects (20 lbs) – No – 15 lbs max. |
| ☐ | 3  $z | Vacuum floors – Yes<br>Clean counters / work surfaces – Yes<br>Move objects (20 lbs) – Yes |

Previous 212 | Next 124 | Cancel 128
Customize 630 | Change Request 632 | Order Robot 640

Comparison Window 800

Computing Device 110

System Bar 132

FIG. 8

1910 Receive, at a computing device, a configuration request for a robotic device, the configuration request including environmental information and task information for one or more tasks requested to be performed by the robotic device in an environment

1920 Determine one or more task-associated regions in the environment for the one or more tasks using the computing device, where a task-associated region for a given task of the one or more tasks includes a region of the environment that the robotic device is expected to reach while performing the given task in the environment

1930 Based at least in part on the one or more task-associated regions determined for the one or more tasks, the computing device determining respective dimensions of one or more components of the robotic device and an arrangement for assembling the one or more components into the robotic device so that the robotic device is configured to perform at least one task of the one or more tasks in the environment

1940 Provide a configuration for the robotic device using the computing device, where the configuration includes the respectively determined dimensions and the determined arrangement

2010 Receive, via a user interface of a computing device, a query related to a configuration request, where the query includes environmental information and task information for one or more tasks requested to be performed by a robotic device in the environment

2020 Generate the configuration request for the robotic device, where the configuration request includes the environmental information and the task information

2030 Provide the configuration request for the robotic device

2040 After providing the request, receive a configuration for the robotic device, where the configuration includes respective dimensions of one or more components of the robotic device and an arrangement for assembling the one or more components into the robotic device so that the robotic device is configured to perform at least one task of the one or more tasks in the environment

2050 Provide an output related to the received configuration using the computing device

FIG. 20

MODULAR ROBOT DESIGN

CROSS-REFERENCE TO RELATED APPLICATION

This application is a continuation of and claims priority to U.S. patent application Ser. No. 15/345,508, filed Nov. 7, 2016, which is hereby incorporated by reference in its entirety.

BACKGROUND

Robotic devices, including mobile robotic devices, can be used in a number of different environments to accomplish a variety of tasks. For example, robotic devices can deliver items, such as parts or completed products, within indoor environments, such as warehouses, hospitals and/or data centers. In home environments, robotic devices can assist with household chores, such as cleaning and moving objects. Robotic devices can also be used in extreme environments, such as undersea, polluted, and outer space environments, to perform tasks that may be specific to that environment; e.g., underwater welding, toxic waste removal, and space station construction.

SUMMARY

In one aspect, a method is provided. A computing device receives a configuration request for a robotic device. The configuration request includes environmental information and task information for one or more tasks requested to be performed by the robotic device in an environment. The computing device determines one or more task-associated regions in the environment for the one or more tasks, where a task-associated region for a given task of the one or more tasks includes a region of the environment that the robotic device is expected to reach while performing the given task in the environment. Based at least in part on the one or more task-associated regions determined for the one or more tasks, the computing device determines respective dimensions of one or more components of the robotic device and an arrangement for assembling the one or more components into the robotic device so that the robotic device is configured to perform at least one task of the one or more tasks in the environment. The computing device provides a configuration for the robotic device, where the configuration includes the respectively determined dimensions and the determined arrangement.

In another aspect, a computing device is provided. The computing device includes one or more processors and data storage. The data storage includes at least computer-executable instructions stored thereon that, when executed by the one or more processors, cause the computing device to perform functions. The functions include: receiving a configuration request for a robotic device, the configuration request including environmental information and task information for one or more tasks requested to be performed by the robotic device in an environment; determining one or more task-associated regions in the environment for the one or more tasks, where a task-associated region for a given task of the one or more tasks includes a region of the environment that the robotic device is expected to reach while performing the given task in the environment; based at least in part on the one or more task-associated regions determined for the one or more tasks, determining respective dimensions of one or more components of the robotic device and an arrangement for assembling the one or more components into the robotic device so that the robotic device is configured to perform at least one task of the one or more tasks in the environment; and providing a configuration for the robotic device, where the configuration includes the respectively determined dimensions and the determined arrangement.

In another aspect, a non-transitory computer readable medium is provided. The non-transitory computer readable medium has stored thereon instructions, that when executed by one or more processors of a computing device, cause the computing device to perform functions. The functions include: receiving a configuration request for a robotic device, the configuration request including environmental information and task information for one or more tasks requested to be performed by the robotic device in an environment; determining one or more task-associated regions in the environment for the one or more tasks, where a task-associated region for a given task of the one or more tasks includes a region of the environment that the robotic device is expected to reach while performing the given task in the environment; based at least in part on the one or more task-associated regions determined for the one or more tasks, determining respective dimensions of one or more components of the robotic device and an arrangement for assembling the one or more components into the robotic device so that the robotic device is configured to perform at least one task of the one or more tasks in the environment; and providing a configuration for the robotic device, where the configuration includes the respectively determined dimensions and the determined arrangement.

In another aspect, an apparatus is provided. The apparatus includes: means for receiving a configuration request for a robotic device, the configuration request including environmental information and task information for one or more tasks requested to be performed by the robotic device in an environment; means for determining one or more task-associated regions in the environment for the one or more tasks, where a task-associated region for a given task of the one or more tasks includes a region of the environment that the robotic device is expected to reach while performing the given task in the environment; means for, based at least in part on the one or more task-associated regions determined for the one or more tasks, determining respective dimensions of one or more components of the robotic device and an arrangement for assembling the one or more components into the robotic device so that the robotic device is configured to perform at least one task of the one or more tasks in the environment; and means for providing a configuration for the robotic device, where the configuration includes the respectively determined dimensions and the determined arrangement.

In another aspect, a method is provided. A user interface of a computing device a query related to a configuration request. The query includes environmental information describing an environment and task information for one or more tasks expected to be performed by a robotic device in the environment. The computing device generates the configuration request for the robotic device, where the request for the configuration includes the environmental information and the task information. The computing device provides the configuration request. After providing the request, the computing device receives a configuration for the robotic device. The configuration includes respective dimensions of one or more components of the robotic device and an arrangement for assembling the one or more components into the robotic device so that the robotic device is configured to perform at least one task of the one or more tasks in the environment. The computing device provides an output related to the received configuration.

In another aspect, a computing device is provided. The computing device includes a user interface, one or more processors, and data storage. The data storage includes at least computer-executable instructions stored thereon that, when executed by the one or more processors, cause the computing device system to perform functions. The functions include: receiving, via the user interface, a query related to a configuration request, where the query includes environmental information describing an environment and task information for one or more tasks expected to be performed by a robotic device in the environment; generating the configuration request for the robotic device, where the request for the configuration includes the environmental information and the task information; providing the configuration request for the robotic device; after providing the request, receiving a configuration for the robotic device, where the configuration includes respective dimensions of one or more components of the robotic device and an arrangement for assembling the one or more components into the robotic device so that the robotic device is configured to perform at least one task of the one or more tasks in the environment; and providing an output related to the received configuration.

In another aspect, a non-transitory computer readable medium is provided. The non-transitory computer readable medium has stored thereon instructions, that when executed by one or more processors of a computing device, cause the computing device to perform functions. The functions include: receiving, via a user interface, a query related to a configuration request, where the query includes environmental information describing an environment and task information for one or more tasks expected to be performed by a robotic device in the environment; generating the configuration request for the robotic device, where the request for the configuration includes the environmental information and the task information; providing the configuration request for the robotic device; after providing the request, receiving a configuration for the robotic device, where the configuration includes respective dimensions of one or more components of the robotic device and an arrangement for assembling the one or more components into the robotic device so that the robotic device is configured to perform at least one task of the one or more tasks in the environment; and providing an output related to the received configuration.

In another aspect, an apparatus is provided. The apparatus includes: means for receiving a query related to a configuration request, where the query includes environmental information describing an environment and task information for one or more tasks expected to be performed by a robotic device in the environment; means for generating the configuration request for the robotic device, where the request for the configuration includes the environmental information and the task information; means for providing the configuration request for the robotic device; means for, after providing the request, receiving a configuration for the robotic device, where the configuration includes respective dimensions of one or more components of the robotic device and an arrangement for assembling the one or more components into the robotic device so that the robotic device is configured to perform at least one task of the one or more tasks in the environment; and means for providing an output related to the received configuration.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 2 depicts a user interface of a computing device for making additional environment selections related to a robotic device, in accordance with an example embodiment.

FIG. 3A depicts a user interface of a computing device for making task selections related to a robotic device, in accordance with an example embodiment.

FIG. 5 depicts a user interface of a computing device for determining user-specified constraints related to a robotic device, in accordance with an example embodiment.

FIG. 6 depicts a user interface of a computing device for displaying robotic device configurations, in accordance with an example embodiment.

FIGS. 7 and 8 depict a user interface of a computing device for comparing robotic device configurations, in accordance with an example embodiment.

FIG. 19 is a flowchart of another method, in accordance with an example embodiment.

FIG. 20 is a flowchart of yet another method, in accordance with an example embodiment.

DETAILED DESCRIPTION

Figure 1:
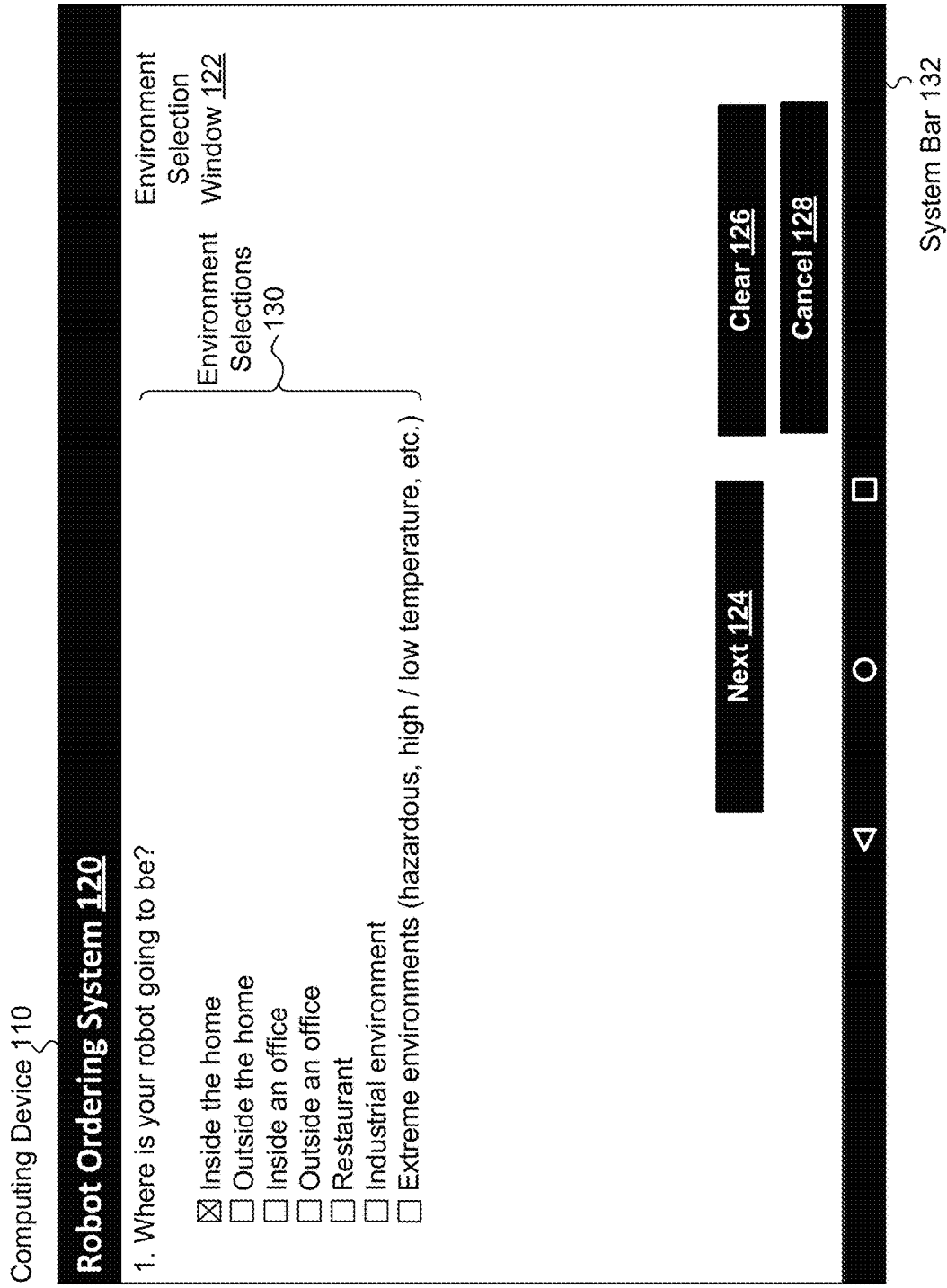
FIG. 1 depicts a user interface of a computing device for making environment selections related to a robotic device, in accordance with an example embodiment.

Disclosed herein are techniques and apparatus for configuring and building robotic devices designed to perform a set of one or more tasks, such as manipulation tasks. A computing device can generate, send, and/or receive a request to configure a robotic device designed to perform one or more tasks, perhaps in a particular environment. Upon receiving the request, a computing device can generate and provide one or more configurations for a robotic device. Each configuration can include information about one or more components of the robotic device (e.g., a parts list, a bill of materials). The information about the component(s) can include, but is not limited to, information about respective dimensions, such as height, width, depth, weight, counts, sizes, etc., of the component(s), information about parameters and components for the robotic device (e.g., link lengths, part identifiers, number of joints, type of joints, tipping point values), information about selection and placement of component(s) (e.g., sensor and/or actuator selection and/or placement), information about selection and implementation of particular mechanism(s) of the robotic devices (e.g., gravity compensation mechanisms), information about design of component centers of mass (e.g., design of link/component centers of mass), information about thermal properties of component(s), thermal management of component(s), and/or component(s) related to thermal management system(s), information about electronics used by/with the component(s) (e.g., actuator-matching drive electronics, sensor interface electronics), information about computational resources associated with, provided by, and/or used by the component(s), and information about additional criteria about the robotic device; e.g., costs, shipping weights, etc.

The configuration can include an arrangement that enables assembly of at least some of the components into a functioning robotic device—the arrangement can include, but is not limited to, blueprints, designs, schematics, instructions, explanations, manuals, circuit and wiring diagrams, and datasheets usable for assembling at least some of the components into a functioning robotic device. The configuration can have enough information to enable assembly of a robotic device that can perform some or all of the tasks. Then, the robotic device can be configured to perform the task(s) in the particular environment when the component(s) are assembled according to the arrangement for assembling the component(s). In some cases, a computing device can generate a request to construct one or more robotic devices as configured by one or more of the provided configuration(s).

As indicated above, a configuration of a robotic device includes information about one or more components of the robotic device and information about an arrangement for assembling the one or more components into the robotic device. The information about one or more components can be termed as a list of components. Note that the term "list" as used herein does not imply use of a specific data structure or representation. For example, a list of components can be implemented using one or more lists, queues, trees, tables, databases, objects, and/or other data representations suitable for representing one or more collections of one or more components. The information about an arrangement can include one or more designs, plans, blueprints, schemes, images, words, and/or other data representations suitable for representing information for assembling and/or arranging components into a robotic device.

Other information related to components and/or arrangements can be included in a configuration of a robotic device. For example, one or more constraints on the robotic device can be included in the configuration and/or can be satisfied to determine the configuration.

In some cases, the computing device can provide multiple configurations in response to the request for configuring the robotic device. For example, the requested robotic device can be requested to maintain a home environment by performing cleaning tasks in the home environment, such as vacuuming floors. The computing device can determine that, for this example, multiple robotic configurations are available that specify a robotic device that can vacuum floors in a home environment. When multiple robotic configurations are provided, then the one or more criteria may be used to compare the multiple robotic configurations; e.g., configuration A is cheaper than configuration B, but the design of configuration A involves a bulkier and less flexible robotic device than configuration B.

A user interface can be provided for generating the request for robotic device configurations, evaluating robotic device configurations, and generating a request to construct a robotic device. For example, the user interface can enable user selection of one or more tasks that a robotic device is to be configured to perform. The task(s) can include, but are not limited to:

tasks involving movement of the robotic device within the particular environment; e.g., tasks related to transportation and/or exploration, tasks involving movement of other objects within the particular environment; e.g., tasks related to manufacturing, object assembly and/or disassembly, food preparation, and/or medical procedures, tasks related to observing the particular environment; e.g., tasks related to environmental monitoring, data gathering, and/or gathering samples in the particular environment, tasks related to maintaining at least a portion of the particular environment; e.g., cleaning tasks, and tasks concerning at least one object in the particular environment; e.g., personal assistance and/or object repair tasks.

The user interface can also enable selection of one or more environments for task performance. For example, the user interface can allow for selection of a cleaning task in an office environment, which may differ from a cleaning task in a home environment or a cleaning task in an outdoor environment.

The user interface can include a simulator to verify whether a configuration for a robotic device will be able, once embodied as an actual robotic device, to perform the set of task(s). The simulator can provide images, video, and/or audio that illustrate expected performance of the robotic device performing the task, which can include any limitations the robotic device may have in task performance. For example, the simulator that indicate a maximum weight or mass of object(s) that the configured robotic device can move within an environment during task performance. The simulator can provide images, video, and/or audio that show ranges of motion of at least part of the configured robotic device (e.g., movement of the robotic device, actuator manipulability graphs). In some examples, different colors may be used to distinguish levels of manipulability/dexterity within the different ranges of motion of the configured robotic device.

In some examples, the user interface can include functionality to reconfigure the robotic device after reviewing a provided configuration and/or information provided by the simulator. That is, the user interface can enable modification of information associated with the robotic configuration, such enabling addition, updating, removing, and/or reviewing of tasks, components, criteria, environment(s), and/or parameters associated with a configuration of the robotic device.

The user interface and/or a computing device executing software for the user interface can generate and send the request to configure a robotic device. For example, the request can be communicated to a computing device with robotic configuration software. The robotic configuration software can receive the request and translate the task(s) specified in the request, along with other information such as components, criteria, environment(s), and/or parameters in the request, to one or more robotic device configurations. Each of the robotic device configuration(s) can enable a robotic device, if built according to the configuration, to accomplish some or all of the task(s) specified in the request. The robotic device configuration can be used by one or more (other) computing devices and associated equipment to construct a robotic device, and so the robotic device configuration can include components (e.g., a bill of materials), designs, parameter names and values, and perhaps other information about the configured robotic device.

Providing a task-based selection of robotic platforms allows choice of robotic devices based tasks that the robotic device is expected to perform. This task-based approach can simplify decisions related to obtaining and using robotic devices, while optimizing costs and components related to the robotic device by using tasks-specific configurations. Ordering robotic devices based on tasks allows relatively-novice owners to obtain customized robotic devices, as the owner does not have to know about differences in robotic components, designs, or other criteria that are unrelated to the task(s) to be performed by the robotic device. Further, as components change, a robotic device purchaser can specifying robotic devices based on tasks eases the introduction of new components into robotic devices as ordering robotic devices. Thus, these techniques enable easy customization of robotic devices based on task information readily available to a (future) robotic device owner or user.

Techniques and Apparatus for Modular Robotic Design

FIGS. 1-12 are associated with scenario 100 for ordering a robotic device. In scenario 100, a user interface of computing device 110 entitled as robot ordering system 120 is used to obtain environmental information, task information, and information about additional constraints as part of a query related to a request for a configuration of a robotic device. A constraint can be or indicate a condition that is to be satisfied by part or all of a configuration of a robotic device; e.g, a maximum or minimum cost, weight, size, power usage, output, etc. of part or all of the robotic device that is to satisfied by a configuration of a robotic device. For example, a constraint on the entire robotic device can be that the maximum weight allowed for a configuration of a robotic device is W pounds (or K kilograms). As another example, one or more constraints can specify that no link of the robotic device is to be less than IMIN inches (or CMIN centimeters) long and is to be more than IMAX inches (or CMAX centimeters) long. Many other constraints are possible as well.

Once all of the information has been obtained, computing device 110 generates and sends the request for the configuration of a robotic device. After sending the request, computing device 110 receives three configurations for three respective robotic devices as part of scenario 100. Each configuration includes information about components of the respective robotic device and information about an arrangement for assembling the one or more components a robotic device that can perform at least one task specified in the task information. In scenario 100, one of the three configurations is reviewed in detail using as robot ordering system 120 of computing device 110, and as robot ordering system 120 subsequently receives a request to order construction of a robotic device based on a selected configuration. After receiving the request to order construction, computing device 110 generates and sends the request to order construction, which is subsequently confirmed.

FIG. 1 shows a user interface of computing device 110 entitled "Robot Ordering System" 120 for making environment selections related to a robotic device, in accordance with an example embodiment. In FIG. 1, robot ordering system 120 specifically shows environment selection window 122 with next button 124, clear button 126, cancel button 128, environment selections 130, and system bar 132.

Environment selections 130 include a question "Where is your robot going to be?" prompting for environmental selections, and several environmental selections "Inside the home", "Outside the home", "Inside an office", "Outside an office", "Restaurant", "Industrial environment", and "Extreme environments (hazardous, high/low temperature, etc.)". One or more of environmental selections 130 can be chosen to indicate environment(s) where a robotic device is likely to operate. In scenario 100, the "Inside the home" selection is chosen indicating that a robotic device is to be utilized in a home environment as indicated by an X in a box preceding the chosen "Inside the home" environment selection.

Next button 124 can be used to proceed to a next screen, display, or window of robot ordering system 120. Clear button 126 can be used to remove all selections from environment selections 130; i.e., clear out all of environment selections 130. Cancel button 128 can be used to terminate execution of robot ordering system 120; e.g., exit an application providing robot ordering system 120.

System bar 132 shows a triangle, circle, and square, which can be used to return to a previous application executed prior to robot ordering system 120 by selecting the triangle, return to a home screen by selecting the circle, and provide a listing of all executed applications by selecting the square. Graphical elements, such as a selection of environment selections 130 and/or other selectors and selections, environment specifications, buttons of robot ordering system 120, and the triangle, circle, and square of system bar 626, can be selected using a user input device of computing device 110. Example user input devices are described below in the context of user interface module 1801 shown in FIG. 18A. In other scenarios and/or embodiments, more, fewer, and/or different information, selections, and/or user-interface controls (e.g., checkboxes, radio buttons, pop-ups, dialogs, buttons, sliders, etc.) can be provided by environment selection window 122.

Scenario 100 continues with next button 124 being selected while environment selection window 122 is displayed and the subsequent display of environment sub-selection window 200.

FIG. 2 depicts environment sub-selection window 200 of robot ordering system 120 of computing device 110 for making additional environment selections related to a robotic device, in accordance with an example embodiment. Environment sub-selection window 200 includes environment sub-selections 210, previous button 212, next button 124, clear button 126, cancel button 128, and system bar 132. Next button 124, clear button 126, cancel button 128, and system bar 132 are discussed above in the context of FIG. 1.

Environment sub-selections 210 include a question "Where is your robot going to be inside the home" that prompts for environmental sub-selections related to environment selection 130 of "Inside the Home" chosen earlier in scenario 100. Environment sub-selections 210 include several environmental sub-selections including "Kitchen", "Bathroom", "Bedrooms", "Living room/dining room/hallways", and "Garage". In other scenarios and/or embodiments of robotic ordering system 120, more and/or different environmental sub-selections 210 can be provided and/or chosen. In scenario 100 and as shown in FIG. 2, specific environment sub-selections 210 of "Kitchen", "Bedrooms", and "Living room/dining room/hallways" indicating that a robotic device is selected to be used in kitchen(s), bedroom(s), living room(s), dining room(s) and hallway(s) of a home environment as indicated by an X in a box preceding each chosen environment sub-selection.

Previous button 212 can be used to return to a prior screen, display, or window of robot ordering system 120. For example, if previous button 212 were selected in environment sub-selection window 200, robotic ordering system 120 would be instructed to return to environment selection window 122. In other scenarios and/or embodiments, more, fewer, and/or different information, selections, and/or user-interface controls can be provided by environment sub-selection window 200.

Scenario 100 continues with next button 124 being selected while environment sub-selection window 200 is displayed and the subsequent display of task selection window 300.

FIG. 3A depicts task selection window 300 of robot ordering system 120 of computing device 110 for making task selections related to a robotic device, in accordance with an example embodiment. Task selection window 300 includes task selections 310, previous button 212, next button 124, clear button 126, cancel button 128, and system bar 132. Next button 124, clear button 126, cancel button 128, and system bar 132 are discussed above in the context of FIG. 1 and previous button 212 is discussed above in the context of FIG. 2.

Task selections 310 include a question "What is your robot going to do inside the home?" that prompts for task selections related to environment selection 130 of "Inside the Home" and environment sub-selections 210 "Kitchen", "Bedrooms", and "Living room/dining room/hallways" chosen earlier in scenario 100. FIG. 3A shows that task selections 310 include "Vacuum floors", "Sweep/mop floors", "Clean counters/work surfaces", "Move objects", and "Home safety/monitoring". In other scenarios and/or embodiments of robotic ordering system 120, more, fewer, and/or different task selections 310 can be provided and/or chosen. In scenario 100 and as shown in FIG. 3A, specific task selections 310 of "Vacuum floors", "Clean counters/ work surfaces", and "Move objects" are chosen, indicating that a robotic device is selected to be used to vacuum floors, clean counters and/or work surfaces, and move objects in kitchen(s), bedroom(s), living room(s), dining room(s) and hallway(s) of a home environment as indicated by an X in a box preceding each chosen task selection. In other scenarios and/or embodiments, more, fewer, and/or different information, selections, and/or user-interface controls can be provided by task selection window 300.

Figure 3B:
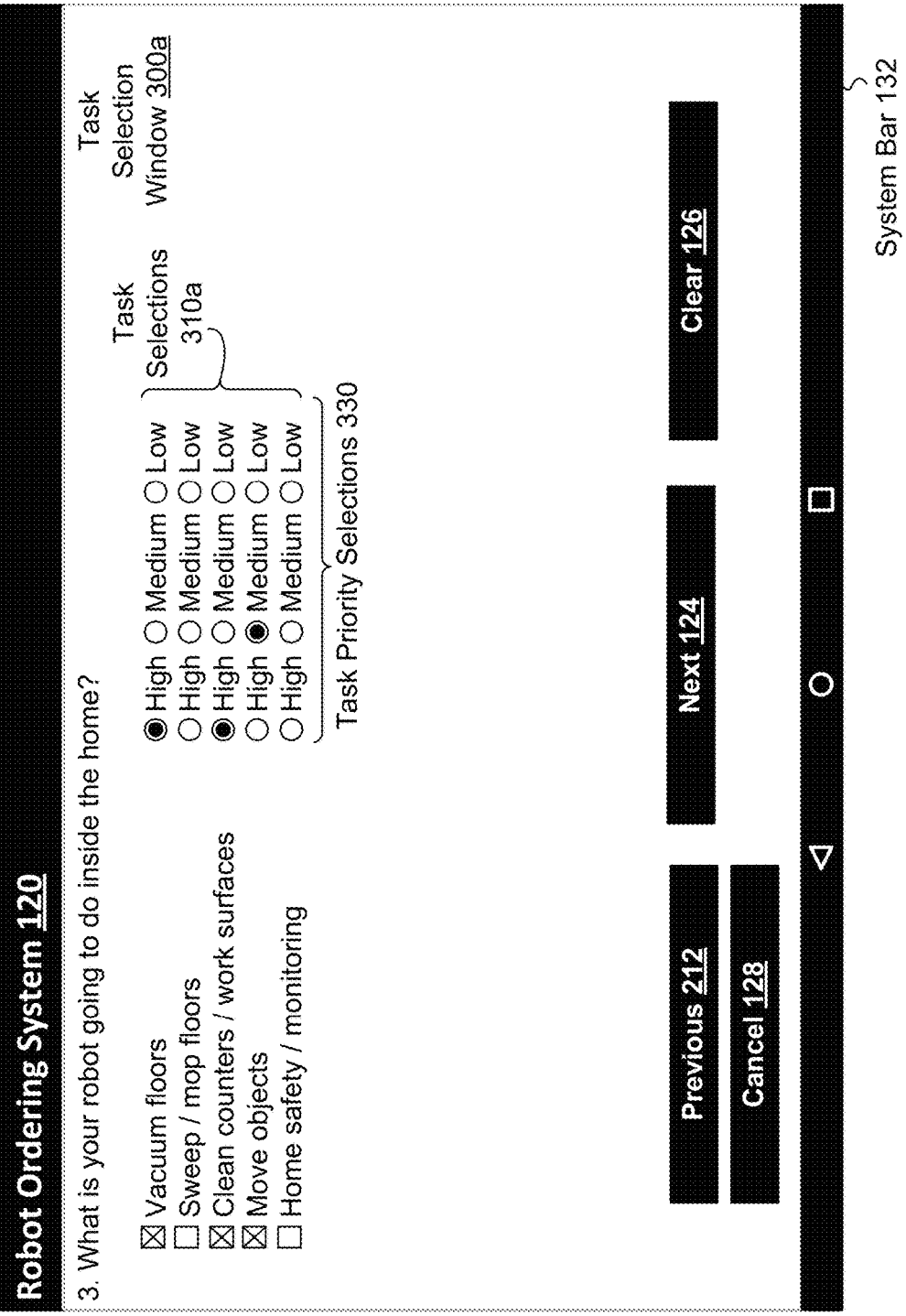
FIG. 3B depicts another user interface of a computing device for making task selections related to a robotic device, in accordance with an example embodiment.

FIG. 3B depicts task selection window 300a of robot ordering system 120 of computing device 110 for making task selections related to a robotic device, in accordance with an example embodiment. Task selection window 300a is used in scenario 100a and includes task selections 310a, previous button 212, next button 124, clear button 126, cancel button 128, and system bar 132. Next button 124, clear button 126, cancel button 128, and system bar 132 are discussed above in the context of FIG. 1 and previous button 212 is discussed above in the context of FIG. 2.

As with task selections 310 of FIG. 3A, task selections 310a of FIG. 3B include a question "What is your robot going to do inside the home?" that prompts for task selections related to environment selection 130 of "Inside the Home" and environment sub-selections 210 "Kitchen", "Bedrooms", and "Living room/dining room/hallways" chosen earlier in scenario 100. FIG. 3B also shows that task selections 310a, like task selections 310, include "Vacuum floors", "Sweep/mop floors", "Clean counters/work surfaces", "Move objects", and "Home safety/monitoring". Unlike task selections 310 of FIG. 3A, task selections 310a of FIG. 3B include task priority selections 330. Task priority selections 330 allow selection of one of three priorities for each of task selections 310a—the three priorities include "High", "Medium", and "Low" priorities.

In scenario 100a and as shown in FIG. 3A, specific task selections 310 of "Vacuum floors", "Clean counters/work surfaces", and "Move objects" and respective task priority selections 330 of "High", "High" and "Medium" are chosen, indicating that a robotic device is selected to be used to vacuum floors, clean counters and/or work surfaces, and move objects in kitchen(s), bedroom(s), living room(s). Also, dining room(s) and hallway(s) and that vacuuming floors and cleaning counters are high-priority tasks while moving objects is a medium-priority task. In other scenarios and/or embodiments of robotic ordering system 120, more, fewer, and/or different task selections 310 and/or task priority selections 330 can be provided and/or chosen. In other scenarios and/or embodiments, more, fewer, and/or different information, selections, and/or user-interface controls can be provided by task selection window 300a.

Scenario 100 continues with next button 124 being selected while task selection window 300 is displayed and the subsequent display of environment specification window 400.

Figure 4:
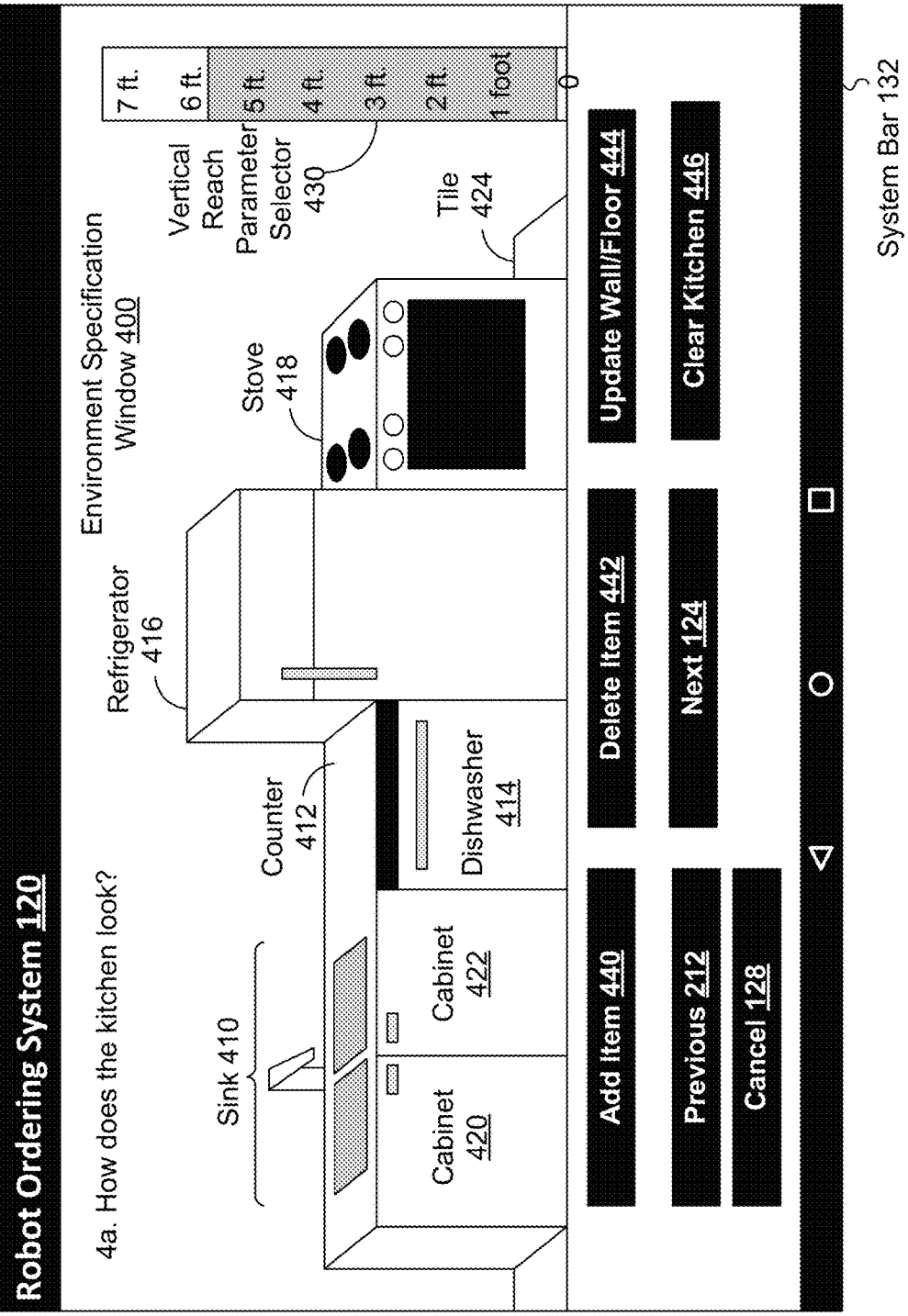
FIG. 4 depicts a user interface of a computing device for specifying an environment related to a robotic device, in accordance with an example embodiment.

FIG. 4 depicts environment specification window 400 of robot ordering system 120 of computing device 110 for specifying an environment related to a robotic device, in accordance with an example embodiment. Environment specification window can be used to generate a specification of at least a portion of the environment, which can be a three-dimensional specification of the environment. In the example shown in FIG. 4, environment specification window 400 displays a three-dimensional kitchen environment with sink 410, counter 412, dishwasher 414, refrigerator 416, stove 418, cabinets 420 and 422, and tile 424 in keeping with environment sub-selections 210 that included selection of a kitchen environment.

Environment specification window 400 includes a question "How does the kitchen look?" that prompts for selections related to a kitchen environment. Environment specification window 400 also includes vertical reach parameter selector 430, add item button 440, delete item button 442, update wall/floor button 444, previous button 212, next button 124, clear kitchen button 446, cancel button 128, and system bar 132. Next button 124, cancel button 128, and system bar 132 are discussed above in the context of FIG. 1 and previous button 212 is discussed above in the context of FIG. 2.

Vertical reach parameter selector 430 can be used to specify a reach range with respect to a Y-axis (vertically), where the reach range indicates how far in the vertical direction that the robotic device should be able to reach objects. In the example shown in FIG. 4, the gray region of vertical reach parameter selector 430 shows that a range from about 3 inches/0.25 feet to about 68 inches/5.667 feet is selected. Vertical reach parameter selector 430 can be used to show a reach range with respect to objects in the environment. In the context of the kitchen displayed in FIG. 4, vertical reach parameter selector 430 shows that the vertical reach range of the robotic device ranges from points near tile 424 to points atop refrigerator 416. In other embodiments, horizontal and/or depth reach parameter selectors can be used to with, or instead of vertical reach parameter selector 430; e.g., to provide three-dimensional information about the environment. In these embodiments, the horizontal and depth reach parameter selectors can be used to indicate reach ranges for robotic devices range with respect to respective X (horizontal) and Z (depth) axes. In still other embodiments, reach ranges and other parameters can be specified using metric, as opposed to, English units—in particular of these embodiments, one or more settings of robot ordering system 120 and/or computing device 110 can be used to determine whether metric, English, or some other system of units should be used by robot ordering system 120 and/or computing device 110.

Add item button 440 enables selection of one or more items commonly found in an environment; for example, in a kitchen environment, selection of a table can lead to the addition of one or more tables and perhaps table-related items; e.g., dishes, silverware, glassware, napkins, serving trays, etc. As another example, adding a printer in an office environment can lead to the addition of one or more printers and perhaps printer-related items; e.g., paper, shelves, filing cabinets, staplers. Many other examples of adding items and related items to environments are possible as well. In some embodiments, addition of items can be achieved by dragging and dropping items into environment specification window 400; e.g., for a kitchen environment, one or more of kitchen items can be presented (e.g., upon selection of add item button 440) and selected kitchen items dragged and dropped into environment specification window 400.

Delete item button 442 enables deletion of one or more items shown in environment specification window 400. In some embodiments, drag-and-drop techniques can be used to delete items shown in environment specification window 400; e.g., dragging item(s) displayed in environment specification window 400 to a deletion region; e.g., trash can, recycle bin; and then dropped into the deletion region for removal/deletion. Update wall/floor button 444 can be used to change aspects of walls, ceilings, and/or flooring displayed in environment specification window 400; e.g., add, update, and/or modify colors, patterns, materials and/or other aspects of tile 424. Clear kitchen button 446 can be used to remove all kitchen-related items displayed in environment specification window 400. In other scenarios and/or embodiments, more, fewer, and/or different information, selections, and/or user-interface controls can be provided by environment specification window 400.

Scenario 100 continues with next button 124 being selected while environment specification window 400 is displayed. After aspects of bedrooms, a living room, a dining room, and hallways are specified using robot ordering device 120 and windows similar to environment specification window 400 are specified, parameter selection window 500 is subsequently displayed.

FIG. 5 depicts parameter selection window 500 of robot ordering system 120 of computing device 110 for determining user-specified constraints related to a robotic device, in accordance with an example embodiment. Parameter selection window 500 includes weight parameter selector 510, horizontal reach parameter selector 520, previous button 212, clear button 126, cancel button 128, send request button 530, and system bar 132. Clear button 126, cancel button 128, and system bar 132 are discussed above in the context of FIG. 1 and previous button 212 is discussed above in the context of FIG. 2.

Send request button 530, when selected, instructs robot ordering system 120 to generate a query related to a request for a configuration for a robotic device, where the query includes information about an environment as well as information about one or more tasks that the robotic device is expected to perform in the environment. The information about the environment can include three-dimensional information about the environment, such as a three-dimensional specification of at least a portion of the environment. In scenario 100, the information about an environment is specified at least using windows 122, 200, and 400 of robot ordering system 120 and the information about one or more tasks is specified at least using window 300 of robot ordering system 120. Additional information, such as information about parameters and/or constraints related to the robotic device, can be specified in the query as well. After generating the query, robot ordering system 120 and/or other components of computing device 110 can generate and send the request for a configuration for a robotic device based on the information in the query. In response to the request, robot ordering system 120 and/or other components of computing device 110 can receive one or more configurations for the robotic device.

Weight parameter selector 510 includes a question "How much weight should the robot be able to carry?" that prompts for selection of a range of weight. Weight parameter selector 510 also includes several ranges of weight that a robotic device could carry that include "At least 10 lbs.", "At least 20 lbs.", "At least 50 lbs.", "At least 100 lbs.", and "At least 200 lbs." In scenario 100, a range of at least 20 pounds has been selected as indicated in FIG. 5 using a black dot inside of a white circle (i.e., a selected radio button control) preceding the "At least 20 lbs." selection. The specification of a range of at least 20 pounds that a robotic device can lift can be used to determine one or more parameter values and/or constraints related to a specification of a robotic device. For example, the specification of a range of at least 20 pounds (about 9.1 kilograms) that a robotic device can lift can determine a constraint on a specification of a robotic device that restricts specifications for robotic devices to those robotic devices that lift 20 pounds or more.

Horizontal reach parameter selector 520 includes a question "What is the longest horizontal reach your robot has to make" that prompts for selection of a horizontal reach range. Horizontal reach parameter selector 520 also has several horizontal reach ranges: "0 inches (no reach at all)", "24 inches (reach across a small/medium size table)", and "36 inches (reach to back of a standard counter)". In scenario 100, a horizontal reach range of 36 inches (about 91 cm) has been selected as indicated in FIG. 5 using a black dot inside of a white circle (i.e., a selected radio button control) preceding the "36 inches (reach to back of a standard counter)" selection. The specification of a horizontal reach range of 36 inches can determine one or more parameter values and/or constraints related to a specification of a robotic device. For example, the specification of a horizontal reach range of 36 inches can determine a constraint on a specification of a robotic device that restricts specifications for robotic devices to those robotic devices that reach at least 36 inches in a horizontal/X-axis dimension. In other scenarios and/or embodiments of robotic ordering system 120, more, fewer, and/or different selectors than selectors 510 and 520 can be provided and/or different values for chosen using selectors 510 and/or 520.

In some embodiments, information about additional user constraints can be provided using parameter selection window 500; e.g., cost-based constraints, availability/shipment date based constraints, etc. In other scenarios and/or embodiments, more, fewer, and/or different information, selections, and/or user-interface controls can be provided by parameter selection window 500.

Scenario 100 continues with send request button 530 being selected and a request for one or more configurations of robotic devices being generated and sent from computing device 110. After sending the request, scenario 100 continues with computing device 110 receiving three configurations of robotic devices that, if assembled, can perform one or more of the tasks specified using task selection window 300 in the environment specified using windows 122, 200, and 400 and meeting constraints and/or having parameter values that are based on values selected using parameter selection window 500. Upon receiving the configurations, robot ordering device 120 can display configuration selection window 600 to display information about and allow selection of one or more of the three received configurations.

Figure 6:
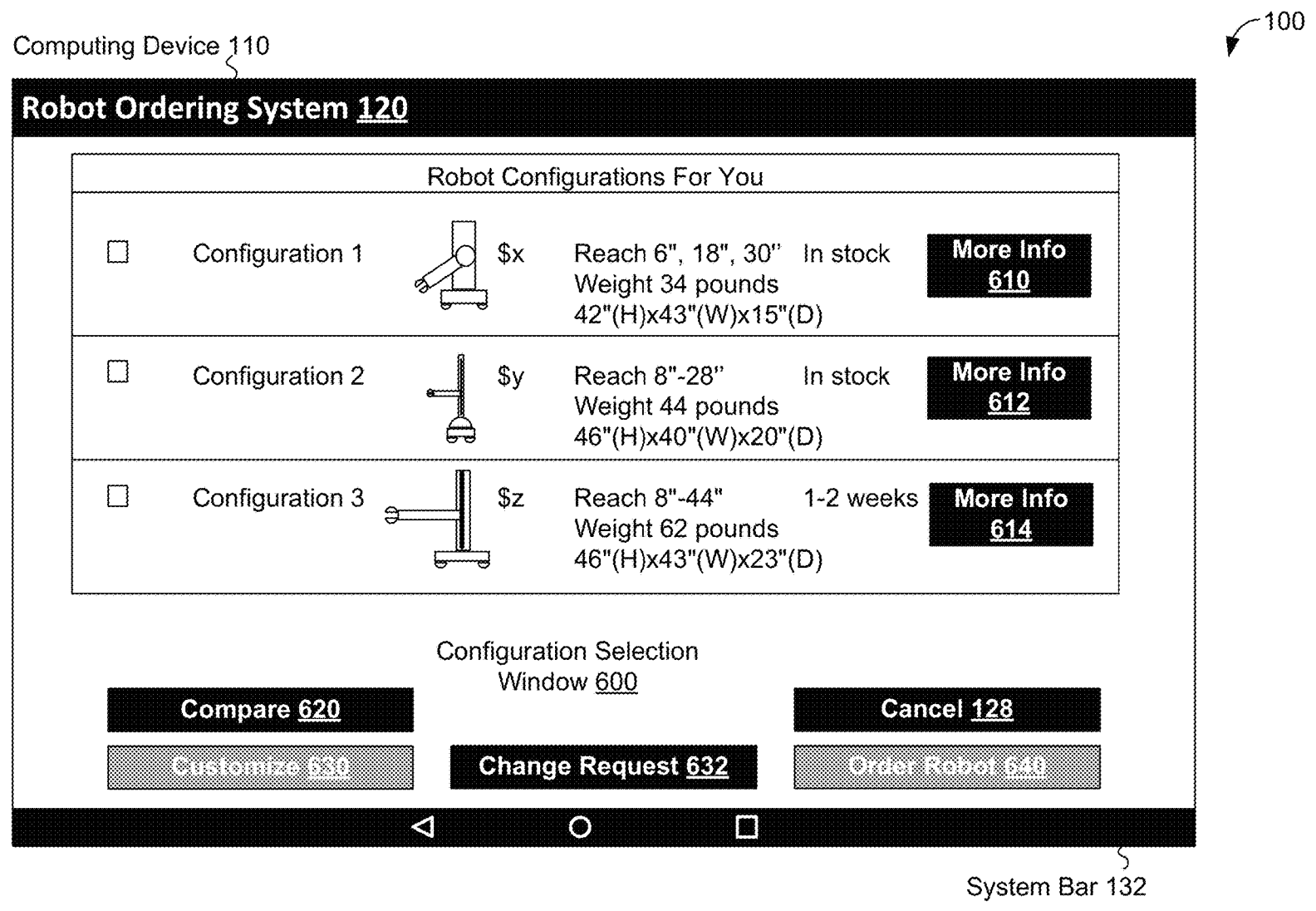

FIG. 6 depicts configuration selection window 600 of robot ordering system 120 of computing device 110 for displaying information about three robotic device configurations "Configuration 1", "Configuration 2", and "Configuration 3", in accordance with an example embodiment. In scenario 100, each of Configurations 1, 2, and 3 can perform at least one of the tasks specified using task selection window 300 in the environment specified using windows 122, 200, and 400 and meeting constraints and/or having parameter values that are based on values selected using parameter selection window 500.

As shown in FIG. 6, configuration selection 600 includes a display for each of Configurations 1, 2, and 3. The display for each configuration includes: a check box to select the configuration for comparison, customization, or ordering; an identifier for the configuration (e.g., Configuration 1, Configuration 2, or Configuration 3); an image of a robotic device specified by the configuration; information about the robotic device specified by configuration; and a more information button. The information shown in FIG. 6 about the Configuration 1 robotic device indicates: the cost for the robotic device is "$x", a reach for the robotic device is 6 inches, 8 inches, and 30 inches, a weight of the robotic device is 34 pounds, dimensions of the robotic device are '42"(H)×43"(W)×15"(D)' or 42 inches in height, 43 inches in width, and 15 inches in depth, and that the robotic device is "in stock" (i.e., immediately available for shipment). Selection of more information button 610 can provide additional information about the Configuration 1 robotic device.

The information shown in FIG. 6 about the Configuration 2 robotic device indicates: the cost for the robotic device is "$y", reach for the robotic device can range between 8 and 28 inches, a weight of the robotic device is 44 pounds, dimensions of the robotic device are '46"(H)×40"(W)×20"(D)' or 46 inches in height, 40 inches in width, and 20 inches in depth, and that the robotic device is in stock. Selection of more information button 612 can provide additional information about the Configuration 2 robotic device. The information shown in FIG. 6 about the Configuration 3 robotic device indicates: the cost for the robotic device is "$z", reach for the robotic device can range between 8 and 44 inches, a weight of the robotic device is 62 pounds, dimensions of the robotic device are '46"(H)×43"(W)×23"(D)' or 46 inches in height, 43 inches in width, and 23 inches in depth, and that the robotic device will take "1-2 weeks" before shipment Selection of more information button 614 can provide additional information about the Configuration 3 robotic device.

Configuration selection window 600 also includes compare button 620, cancel button 128, customize button 630, change request button 632, order robot button 640, and system bar 132. Cancel button 128 is discussed above in the context of FIG. 1. Compare button 620 can be selected to generate a comparison between two or more robotic devices; in the context of scenario 100, the comparison can be between the robotic devices of Configurations 1, 2, and 3.

Customize button 630 can be selected to modify a configuration; e.g., make the configuration custom a particular entity. The configuration can be modified by selecting one or more components in addition to and/or to replace components provided with the configuration. For example, a link or joint provided with the configuration can be replaced by a different link or joint—information about different components that can be customized can be provided after customize button 630 is selected. In FIG. 6, customize button 630 is shown in gray rather than black to indicate that customize button 630 is currently inoperative as none of the configuration-specific checkbox have been selected, and so no configuration has been selected to customize. As no configuration of configuration window 600 has been selected, there is not enough information to determine which configuration is to be customized by robot ordering system 120, and so button 630 is currently inoperative.

Change request button 632 can be selected to modify a request for one or more configurations of robotic devices; e.g., to modify some or all of the information provided using windows 122, 200, 300, 400, 500 and/or other aspects of robot ordering system 120. Order robot button 640 can be selected to generate and send an order for a robotic device having a particular configuration. In FIG. 6, order robot button 640 is shown in gray rather than black to indicate that order robot button 640 is currently inoperative. As no configuration of configuration window 600 is shown as selected, there is not enough information to determine which configuration is to be ordered by robot ordering system 120, and so indicate that order robot button 640 is currently inoperative. In other scenarios and/or embodiments, more, fewer, and/or different information, selections, and/or user-interface controls can be provided by configuration selection window 600.

Scenario 100 continues with compare button 620 being selected to compare the three configurations shown in FIG. 6 and the subsequent generation and display of robot comparison page 710 displaying information comparing Configurations 1, 2, and 3 by robot ordering system 120 of computing device 110.

FIG. 7 depicts comparison window 700 including robot comparison page 710 of robot ordering system 120 of computing device 110 for displaying information comparing Configurations 1, 2, and 3. Robot comparison page 710 indicates that it is "Page 1 of 2"—the second page of the comparison is depicted in FIG. 8.

Robot comparison page 710 includes a display comparing Configurations 1, 2, and 3. The display shown in FIG. 7 includes: a check box to select the configuration for customization or ordering; an identifier for the configuration (e.g., 1, 2, or 3); information about the robotic device specified by the configuration, which includes information about components of the robotic device. The information shown in FIG. 7 about the Configuration 1 robotic device indicates: an image of the robotic device, the cost for the robotic device is "$x", a reach for the robotic device is 6 inches, 8 inches, and 30 inches, a weight of the robotic device is 34 pounds, dimensions of the robotic device are '42"(H)×43"(W)×15"(D)' or 42 inches in height, 43 inches in width, and 15 inches in depth, and that the robotic device is in stock. The information about components of the Configuration 1 robotic device indicates that the robotic device includes one "B100 mobile base", three links including one "L1 link", one "L2 link", and one "L3 link", two joints including one "J1 joint" and one "J2" joint, and one "6-DOF gripper G1" indicating that a G1 gripper has 6 degrees of freedom (DOF).

The information shown in FIG. 7 about the Configuration 2 robotic device indicates: an image of the robotic device, the cost for the robotic device is "$y", reach for the robotic device can range between 8 and 28 inches, a weight of the robotic device is 44 pounds, dimensions of the robotic device are '46"(H)×40"(W)×20"(D)' or 46 inches in height, 40 inches in width, and 20 inches in depth, and that the robotic device is in stock. The information about components of the Configuration 2 robotic device indicates that the robotic device includes one "B220 mobile base", two links including one "L4" link and one "L5" link, two joints including one "J1 joint" and one "J3" joint, one "S1 slide" and one "6-DOF gripper G2" indicating that a G2 gripper has 6 degrees of freedom.

The information shown in FIG. 7 about the Configuration 3 robotic device indicates: an image of the robotic device, the cost for the robotic device is "$z", reach for the robotic device can range between 8 and 44 inches, a weight of the robotic device is 62 pounds, dimensions of the robotic device are '46"(H)>43"(W)×23"(D)' or 46 inches in height, 43 inches in width, and 23 inches in depth, and that the robotic device will take "1-2 weeks" before shipment The information about components of the Configuration 3 robotic device indicates that the robotic device includes one "B300 mobile base", two links including one "L1" link and one "L5a" link, two joints including one "J1 joint" and one "J4" joint, one "S2 slide" and one "6-DOF gripper G1".

Comparison window 700 also includes previous button 212, next button 124, cancel button 128, customize button 630, change request button 632, order robot button 640, and system bar 132. Clear button 126, cancel button 128, and system bar 132 are discussed above in the context of FIG. 1, previous button 212 is discussed above in the context of FIG. 2, and customize button 630, change request button 632, order robot button 640 are discussed above in the context of FIG. 6. In other scenarios and/or embodiments, more, fewer, and/or different information, selections, and/or user-interface controls can be provided by comparison window 700.

Scenario 100 continues with next button 124 being selected and the subsequent generation and display of robot comparison page 810 displaying information comparing Configurations 1, 2, and 3 by robot ordering system 120 of computing device 110.

FIG. 8 depicts comparison window 800 including robot comparison page 810 of robot ordering system 120 of computing device 110 for displaying information comparing Configurations 1, 2, and 3. Robot comparison page 810 indicates that it is "Page 2 of 2"—the first page of the comparison is depicted in FIG. 7.

Robot comparison page 810 includes a display comparing Configurations 1, 2, and 3. The display shown in FIG. 8 includes: a check box to select the configuration for customization or ordering; an identifier for the configuration (e.g., 1, 2, or 3); information about the robotic device specified by the configuration, which includes information about tasks that can be performed by the robotic device. The information shown in FIG. 8 about the Configuration 1 robotic device includes an image of the robotic device and indicates that the cost for the robotic device is "$x". The information about tasks that can be performed by the Configuration 1 robotic device indicates that the robotic device is: unable to vacuum floors, able to clean counters and/or work surfaces, and able to move 20 pound objects.

The information shown in FIG. 8 about the Configuration 2 robotic device includes an image of the robotic device and indicates that the cost for the robotic device is "$y". The information about tasks that can be performed by the Configuration 1 robotic device indicates that the robotic device is: able to vacuum floors, unable to clean counters and/or work surfaces, and able to move 20 pound objects.

The information shown in FIG. 8 about the Configuration 3 robotic device includes an image of the robotic device and indicates that the cost for the robotic device is "$z". The information about tasks that can be performed by the Configuration 13 robotic device indicates that the robotic device is: able to vacuum floors, able to clean counters and/or work surfaces, and able to move 20 pound objects.

Comparison window 800 also includes previous button 212, next button 124, cancel button 128, customize button 630, change request button 632, order robot button 640, and system bar 132. Clear button 126, cancel button 128, and system bar 132 are discussed above in the context of FIG. 1, previous button 212 is discussed above in the context of FIG. 2, and customize button 630, change request button 632, order robot button 640 are discussed above in the context of FIG. 6. In other scenarios and/or embodiments, more, fewer, and/or different information, selections, and/or user-interface controls can be provided by comparison window 800.

Scenario 100 continues with previous button 212 on robot comparison page 810 being selected to return robot ordering system 120 to robot comparison page 810, and previous button 212 being selected again to return robot ordering system 120 to configuration selection window 600. During scenario 100, more information button 614 on configuration selection window 600 is selected to provide more information about the Configuration 3 robotic device. In response, robot ordering system 120 displays information window 900 to provide the information.

Figure 9:
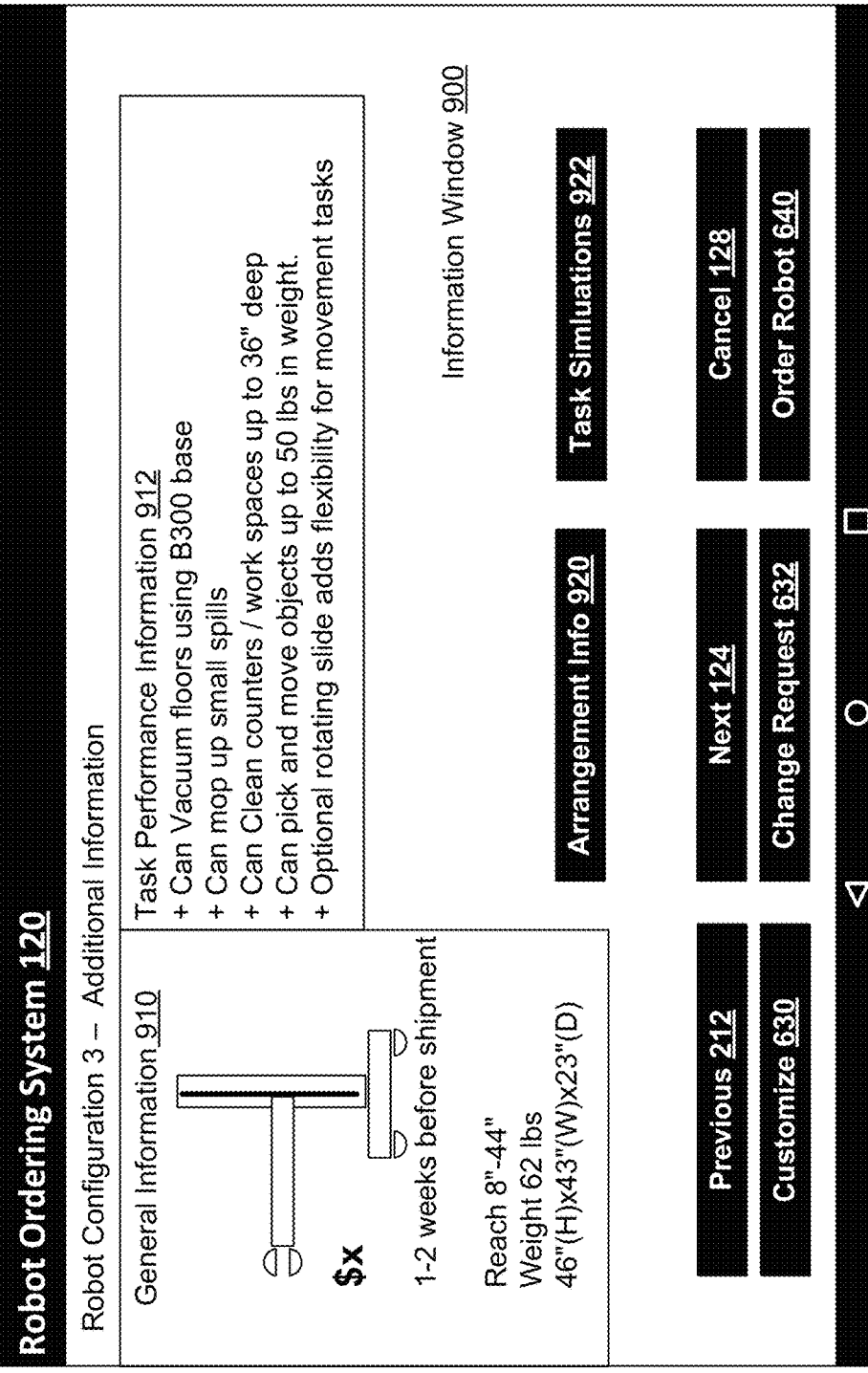
FIG. 9 depicts a user interface of a computing device for displaying information about a selected robotic device configuration, in accordance with an example embodiment.

FIG. 9 depicts information window 900 of robot ordering system 120 of computing device 110 for displaying information about the Configuration 3 robotic device, in accordance with an example embodiment. Information window 900 includes general information 910, task performance information 912, arrangement information button 920, and task simulations button 922. General information 910 shows some information about the Configuration 3 robotic device, including: an image, the "$z" cost, the one to two week wait before robotic device shipment, the reach range of 8 inches to 44 inches, the weight of 62 pounds, and the dimensions of the robotic device being 46 inches in height, 43 inches in width, and 23 inches in depth. Task performance information 912 shows some task-related information about the Configuration 3 robotic device, indicating the robotic device can: "vacuum floors using B300 base", "mop up small spills", "[clean] counters/work spaces up to 36″ deep", and "pick and move objects up to 50 [pounds] in weight". Task performance information 912 also indicates that an "optional rotating slide" for the robotic device can "[add] flexibility for movement tasks".

Arrangement information button 920 can be selected to provide arrangement information about a robotic device having a particular configuration; in scenario 100, selection of arrangement information button 920 can provide arrangement information about a Configuration 3 robotic device. Task simulations button 922 can be selected to display one or more simulations of a robotic device having a particular configuration performing tasks; in scenario 100, selection of task simulations button 922 can lead to display one or more simulations of a Configuration 3 robotic device performing tasks selected previously in the scenario.

Information window 900 also includes previous button 212, next button 124, cancel button 128, customize button 630, change request button 632, order robot button 640, and system bar 132. Clear button 126, cancel button 128, and system bar 132 are discussed above in the context of FIG. 1, previous button 212 is discussed above in the context of FIG. 2, and customize button 630, change request button 632, order robot button 640 are discussed above in the context of FIG. 6.

In FIG. 9, both customize button 630 and order robot button 640 are shown in black, indicating both buttons are activated. Customize button 630 and order robot button 640 can be used to customize a robotic device based on Configuration 3 and to order a robotic device based on Configuration 3, respectively. In scenario 100, selection of more information button 614 indicates to robot ordering system 120 that Configuration 3 has been selected, allowing robot ordering system 120 to activate buttons 630 and 640 in display information window 900. In other scenarios and/or embodiments, more, fewer, and/or different information, selections, and/or user-interface controls can be provided by information window 900. In other scenarios and/or embodiments, more, fewer, and/or different information, selections, and/or user-interface controls can be provided by information window 900.

Scenario 100 continues with task simulations button 922 on information window 900 being selected to cause robot ordering system 120 to display a simulation of a Configuration 3 robotic device performing a counter cleaning task, which is one of the tasks previously specified using task selection window 300 in the environment specified using windows 122, 200, and 400.

Figure 10:
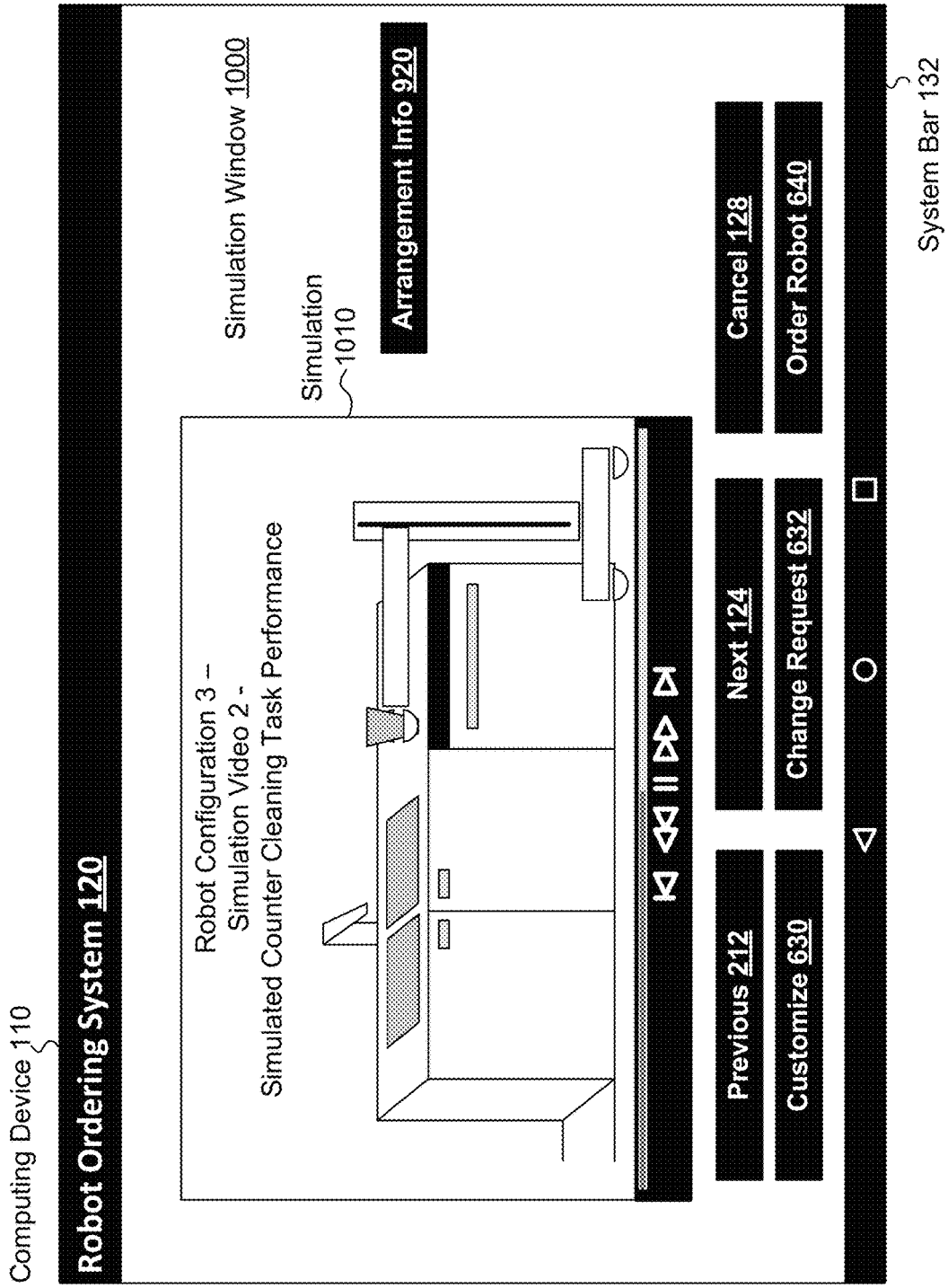
FIG. 10 depicts a user interface of a computing device for displaying simulated task performance of a selected robotic device configuration, in accordance with an example embodiment.

FIG. 10 depicts simulation window 1000 of robot ordering system 120 of computing device 110 for displaying simulated task performance of a selected robotic device configuration, in accordance with an example embodiment. Simulation window 1000 includes simulation 1010 FIG. 10 displays an image of simulation 1010, which is a video representation of a robotic device of "Configuration 3" demonstrating "Simulated Counter Cleaning Task Performance" in a "Simulation Video 2". In the video displayed in simulation 1010, a Configuration 3 robotic device is shown carrying a cup away from a counter top, simulating the cleaning of the counter. In other scenarios and/or embodiments, more and/or different simulations can be provided and displayed. Simulation 1010 also includes a left-pointing-and-lined-triangle control to go to a previous simulation (if available), a double-left-pointing-triangle control to go backwards in a displayed simulation, a double-line control to pause the displayed simulation, a double-right-pointing-triangle control to go forward in a displayed simulation, left-pointing-and-lined-triangle control to go to a next simulation (if available).

Simulation window 1000 also includes arrangement information button 920, previous button 212, next button 124, cancel button 128, customize button 630, change request button 632, order robot button 640, and system bar 132. Arrangement information button 920 is discussed above in the context of FIG. 9. Clear button 126, cancel button 128, and system bar 132 are discussed above in the context of FIG. 1, previous button 212 is discussed above in the context of FIG. 2, and customize button 630, change request button 632, order robot button 640 are discussed above in the context of FIGS. 6 and 9. In other scenarios and/or embodiments, more, fewer, and/or different information, selections, and/or user-interface controls can be provided by simulation window 1000.

Scenario 100 continues with arrangement information button 920 on simulation window 1000 being selected to cause robot ordering system 120 to display information about an arrangement of Configuration 3.

Figure 11:
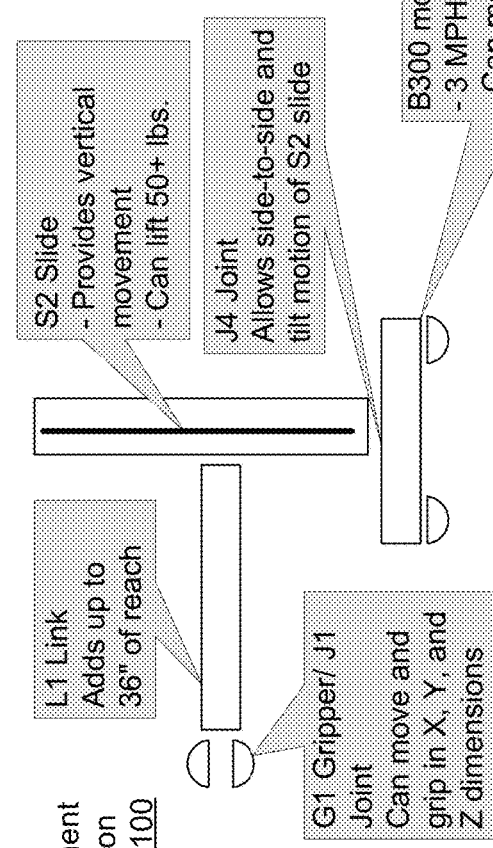
FIG. 11 depicts a user interface of a computing device for displaying arrangement information for a selected robotic device configuration, in accordance with an example embodiment.

FIG. 11 depicts arrangement information window 1100 of robot ordering system 120 of computing device 110 for displaying arrangement information for a Configuration 3 robotic device, in accordance with an example embodiment. Arrangement information window 1100 includes arrangement information display 1110, top view button 1122, side view button 1124, perspective view button 1126, blueprint button 1128, and manipulability button 1130. Arrangement information display 1110 includes an image of the Configuration 3 robotic device showing how components of the robotic device are assembled and information about the components depicted in the image. Display 1110 shows that the Configuration 3 robotic device includes a "L1 Link" that "[adds] up to 36 [inches] of reach", a "G1 Gripper" and "J1 Joint" that can "move and grip in X, Y, and Z dimensions", an "S2 Slide" that "[provides] vertical movement" and can "lift 50+ [pounds]", a "J4 Joint" that "[allows] side-to-side and tilt motion of the S2 slide", and a "B300 mobile base" that can move at "3 MPH (max)", includes a "[vacuum] cleaner", and can "move 50 [pound] objects". In other embodiments and scenarios, more, less, and/or different information about an arrangement and/or components of a robotic device can be provided by arrangement information display 1110.

In scenario 100, top view button 1122 can, when selected, indicate to robot ordering system 120 to provide a view from above of the Configuration 3 robotic device. In scenario 100, side view button 1124, can, when selected, indicate to robot ordering system 120 to provide a view of a side of the Configuration 3 robotic device. In scenario 100, perspective view button 1126 can, when selected, indicate to robot ordering system 120 to provide a perspective view of the Configuration 3 robotic device. In scenario 100, blueprint button 1128 can, when selected, indicate to robot ordering system 120 to provide a detailed plan or blueprint of the Configuration 3 robotic device. In scenario 100, manipulability button 1130 can, when selected, indicate to robot ordering system 120 to provide a display of manipulability and movement information for the Configuration 3 robotic device.

Arrangement information window 1100 also includes task simulations button 922, previous button 212, next button 124, cancel button 128, customize button 630, change request button 632, order robot button 640, and system bar 132. Clear button 126, cancel button 128, and system bar 132 are discussed above in the context of FIG. 1; previous button 212 is discussed above in the context of FIG. 2; customize button 630, change request button 632, and order robot button 640 are discussed above in the context of FIG. 6; and task simulations button 922 is discussed above in the context of FIG. 9. In other scenarios and/or embodiments, more, fewer, and/or different information, images, selections, and/or user-interface controls can be provided using arrangement information window 1100.

Scenario 100 continues with manipulability button 1130 of arrangement information window 1100 being selected to cause robot ordering system 120 to display manipulability and movement information for Configuration 3.

Figure 12:
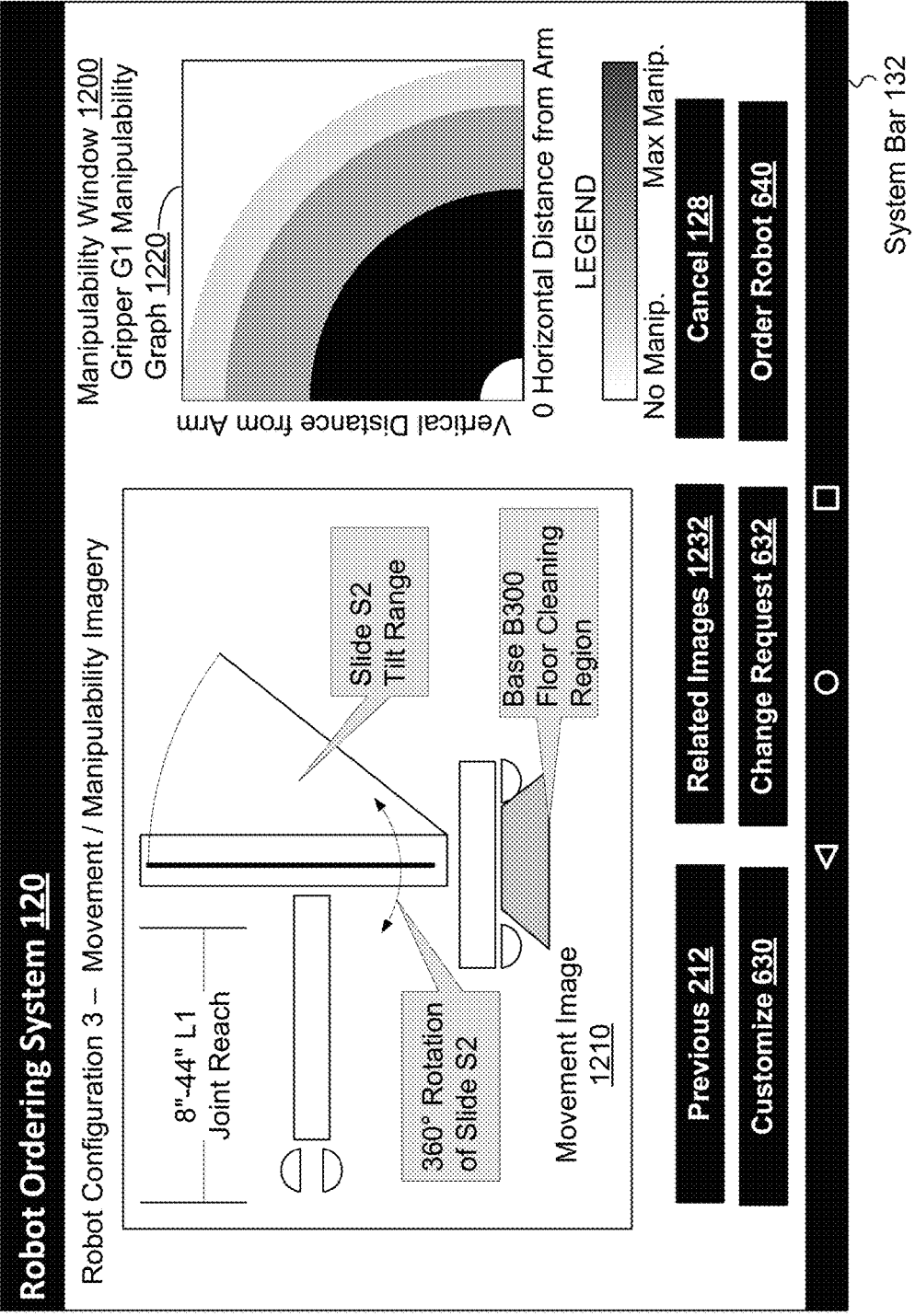
FIG. 12 depicts a user interface of a computing device for displaying manipulability and movement information for a selected robotic device configuration, in accordance with an example embodiment.

FIG. 12 depicts manipulability window 1200 of robot ordering system 120 of computing device 110 displaying manipulability and movement information for a Configuration 3 robotic device, in accordance with an example embodiment. Manipulability window 1200 includes movement image 1210 and gripper G1 manipulability graph 1220. Movement image 1210 shows ranges of motion and other information about motion for components of a Configuration 3 robotic device. Movement image 1210 includes an image of the Configuration 3 robotic device with an indication of an 8 to 44 "Joint Reach" by link L1, an indication that slide S2 can make a "360° rotation", a depiction of a "Tilt Range" for slide S2 showing a range of motion for the slide, and a "Floor Cleaning Region" shown in gray where base B300 can vacuum, and thus clean, floors.

A manipulability index for a component at a point can be a value that indicates an ability of the component to move to and/or apply forces at the point. Gripper G1 manipulability graph 1220 includes a visualization of a manipulability index for gripper G1 included with the Configuration 3 robotic device. As shown in the "LEGEND" of manipulability graph 1220, white coloration in manipulability graph 1220 indicates no manipulability (e.g., zero or relatively-low manipulability index values) for gripper G1, and intermediate shades of gray indicate some manipulability (e.g., relatively-moderate manipulability index values) for gripper G1 that increases as the coloration darkens, and black coloration in manipulability graph 1220 indicates maximum manipulability (e.g., relatively-high or maximum manipulability index values) for gripper G1. The axes of manipulability graph 1220 indicate that manipulability graph 1220 is plotted with a horizontal distance from an end of an arm (e.g., Link L1) on an X-axis and with a vertical distance from the end of the arm on a Y-axis.

FIG. 12 shows that manipulability graph 1220 indicates gripper G1 has maximum manipulability in a relatively-intermediate range of distances from the end of the arm and no manipulability in relatively-close and relatively-far ranges of distances from the end of the arm. Manipulability graph 1220 also indicates intermediate manipulability levels in ranges of distance beyond the maximum manipulability range of distances but within the relatively-far range of distances from the end of the arm where there is no manipulability.

Manipulability window 1200 also includes related images button 1232 that, when selected, provides additional images related to a robotic device; e.g., in scenario 100, a Configuration 3 robotic device. The additional images can include, but are not limited to, additional images of the robotic device, additional movement images, additional manipulability graphs, other still images related to movements and/or manipulability of the robotic device, and video images related to movements and/or manipulability of the robotic device.

Manipulability window 1200 also includes previous button 212, cancel button 128, customize button 630, change request button 632, order robot button 640, and system bar 132. Clear button 126, cancel button 128, and system bar 132 are discussed above in the context of FIG. 1; previous button 212 is discussed above in the context of FIG. 2; and customize button 630, change request button 632, and order robot button 640 are discussed above in the context of FIG. 6. In other scenarios and/or embodiments, more, fewer, and/or different information, images, selections, and/or user-interface controls can be provided using manipulability window 1200. In other scenarios and/or embodiments, more, fewer, and/or different information, images, selections, and/or user-interface controls can be provided by manipulability window 1200.

Scenario 100 continues with order robot button 640 of manipulability window 1200 being selected to cause robot ordering system 120 to generate and send an order to construct a robotic device based on Configuration 3. After sending the order, computing device 110 and/or robot ordering system 120 receive as confirmation that the order was successfully received and the robotic device based on Configuration 3 is in the process of being constructed.

Figure 13:
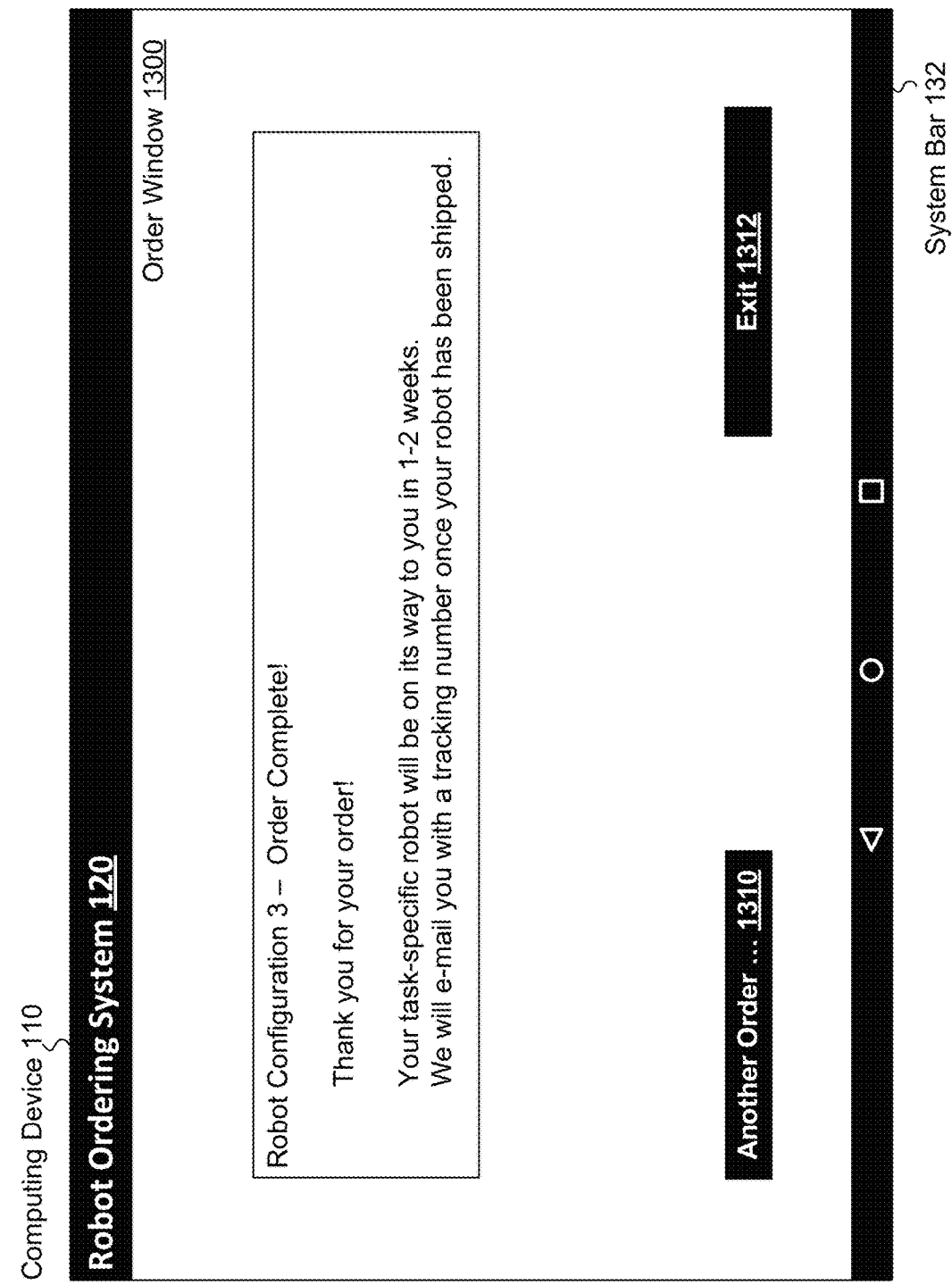
FIG. 13 depicts a user interface of a computing device for displaying a response after successfully ordering construction of a robotic device having a selected robotic device configuration, in accordance with an example embodiment.

FIG. 13 depicts order window 1300 of robot ordering system 120 of computing device 110 for displaying a response after successfully ordering construction of a robotic device having a selected robotic device configuration, in accordance with an example embodiment. Order window 1300 displays information regarding an ordered robotic device indicating that an "Order" of a robotic device is "Complete" and that a configuration of the ordered robotic device is a "Configuration 3" robotic device. Order window 1300 also displays shipment-related information indicating that "[your] task-specific robot will be on its way to you in 1-2 weeks" and that an "e-mail . . . with a tracking number" will be sent "once your robot has been shipped". Order window 1300 also includes another order button 1310 to begin ordering a different robotic device and exit button 1312 to terminate execution of an application providing robot ordering system 120. In other scenarios and/or embodiments, more, fewer, and/or different information, selections, and/or user-interface controls can be provided by order window 1300.

Scenario 100 continues with exit button 1312 of order window 1300 being selected to cause computing device 110 to terminate robot ordering system 120. After robot ordering system 120 is terminated, scenario 100 can be completed. In other scenarios and/or embodiments, more, fewer, and/or different window, pages, information, selections, and/or user-interface controls can be provided by order window robot ordering system 120.

Figure 14:
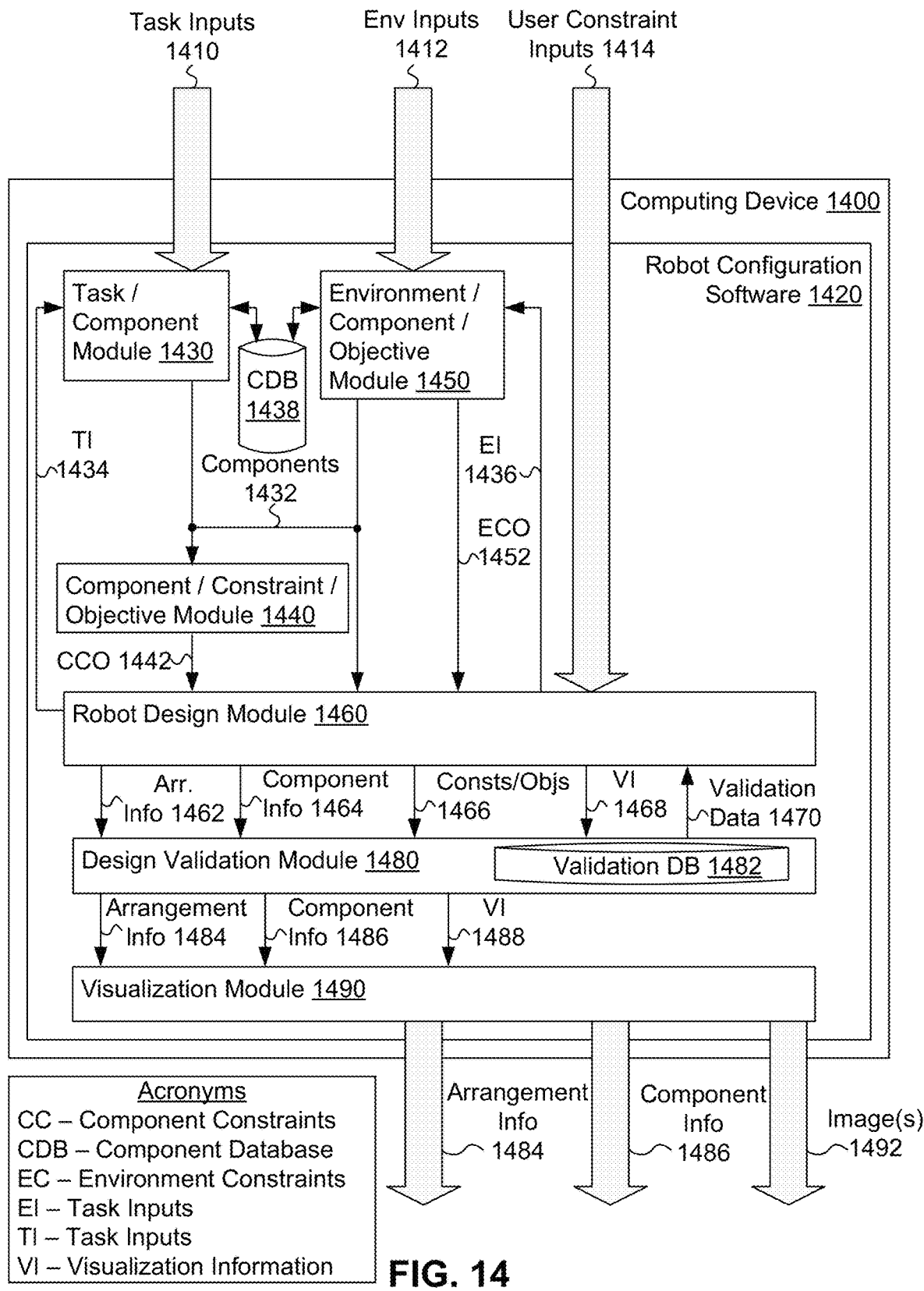
FIG. 14 is a block diagram of robot configuration software for a computing device, in accordance with an example embodiment.

FIG. 14 is a block diagram of robot configuration software 1420 for computing device 1400, in accordance with an example embodiment. Computing device 1400 and robot configuration software can receive inputs related to requested configurations of robotic devices. These inputs can include task inputs 1410, environmental inputs 1412, and user constraint inputs 1414.

Task inputs 1410 can provide information about one or more tasks to be performed by a robotic device. Then, a requested configuration of a robotic device should be able to perform at least some, and perhaps all, of the one or more tasks. The one or more tasks in task inputs 1410 can be identified by task identifiers, such as numerical identifiers (e.g., request to perform Task Numbers 1, 4, 7, and 13), alphanumeric identifiers (e.g., request to perform Task Numbers Home1, Home4, Home7, and Office3), task name identifiers (e.g., request to perform vacuuming, cleaning, movement, and paper shredding tasks), and/or by other identification techniques.

In some embodiments, task inputs 1410 can be prioritized, such as discussed above in the context of FIG. 3B. Priority information can be used to relax task-based constraints on determining configurations of robotic devices. For example, if no configurations of robotic devices can be determined that satisfy all constraints indicated by task inputs 1410, environmental inputs 1412, and user constraint inputs 1412, then task-based constraints associated with relatively-low-priority tasks can be relaxed and/or eliminated. Then, a search for configurations of robotic devices that satisfy the now-relaxed constraints can be performed.

Task inputs 1410, environmental inputs 1412, and/or user constraint inputs 1412 can be used to determine one or more objectives related to configurations of robotic devices. In some embodiments, constraints can act as requirements to narrow choices of configurations and objectives can represent goals to be achieved by configurations. The objectives can be used to score available configurations that meet some or all of the constraints; e.g. a configuration that meets 10 out of 20 objectives can score higher than a configuration that meets 5 of the 20 objectives. In particular embodiments, the objectives can represent weighted multi-objective goals; e.g., a goal can involve a robotic movement objective and a grasping objective, where the movement objective has a first weight or score and the grasping objective has a second weight or score, and then a score of the goal can involve a combination (e.g. a sum, a product, a weighted average) of the first weight/score and the second weight/score.

In other embodiments, task inputs 1410 can be processed to convert task identifiers used by external devices to task identifiers used by computing device 1400 and/or robot configuration software 1420; e.g., software that uses database operations and/or look up tables (or other data and/or software) to convert a task name, such as "Cleaning", used by a computing device providing task inputs 1410, such as computing device 110, to a task identifier used by computing device 1400 and/or robot configuration software 1420, such as Task Number 4.

Environmental inputs 1412 can provide information about one or more environments where a robotic device is to operate. Then, a requested configuration of a robotic device should be able to perform at least some, and perhaps all, tasks specified using task inputs 1410 in the environment(s) specified using environmental inputs 1412. The one or more environments in environmental inputs 1412 can be identified by environmental identifiers such as numerical identifiers (e.g., request to operate in Environments 1 and 4), alphanumeric identifiers (e.g., request to operate in Environments Home2, and Office1), environmental name identifiers (e.g., request to operate in "Medium-Sized Home" and "Small Office" environments), and/or by other identifiers.

In some embodiments, when multiple environments are specified, one or more environments can be prioritized. Environments can be prioritized based on user input; e.g., in a similar fashion as tasks are prioritized in FIG. 3B, and/or using numerical techniques.

In other embodiments, multi-dimensional environments can be specified using environmental inputs 1412. For example, environmental inputs 1412 can specify one or more environments in two dimensions and/or in three dimensions; e.g., using X, Y, and/or Z axes. More generally, multi-dimensional environment inputs 1412 can specify N-dimensional environments, with $N \geq 2$; e.g., an environment with unconstrained rigid bodies can be described using 6 dimensions (3 translational and 3 rotational). Articulated bodies, like a cabinet with a hinged door may be described by a two or three-dimensional location, an orientation, and articulation state (i.e. the door is open at 55°) for a total of five or more dimensions. Environmental inputs 1412 can provide many other specifications of N-dimensional environments as well.

Additionally, environmental inputs 1412 can specify environment(s) that include spatial regions associated with tasks, the ability to reach locations in those regions, manipulability and motion capabilities with respect to spatial structures, interaction force limits, assorted physical properties such as surface properties, mass, and temperature, safety semantics, interaction semantics, and other information that may inform task completion metrics and robot configuration. For example, environmental inputs 1412 can specify an environment that includes a 'no-spark' property; e.g., an environment where flammable materials are present. The no-spark property can remove certain components of robotic devices from eligibility, such as components that have brushed DC motors and/or other components that may generate sparks. As another example, if a cleaning task involves a delicate surface, a configuration with good force tracking properties may be required. In particular of these embodiments, these properties may be described using one or more prior probability distributions.

One numerical technique is for robotic configuration software 1420 to include numerical priorities for environments; e.g., robotic configuration software 1420 can prioritize home environments over office environments (or vice versa). These numerical priorities can be based on predetermined values for environment priorities, a number of robotic devices and/or configurations provided for an environment, a number of configurations available for each environment (e.g., if more robotic device configurations are available for home environments than outdoor environments (or vice versa), then home environments can be prioritized over outdoor environments (or vice versa) with the idea that more possible robotic device configurations for a particular environment makes it more likely that a suitable robotic device is to be found), and/or based on other numerical techniques.

Another of these numerical techniques is to prioritize environments based on tasks performed in the environment. As an example, suppose environmental inputs 1412 relate to two environments: E1 and E2, where environment E1 is associated with a number N1 of tasks, environment E2 is associated with a number N2 of tasks, and N1 is greater than N2 (or vice versa). Then, environment E1 can be prioritized over environment E2 since E1 is associated with more tasks than E2 (or vice versa). If priorities are provided for tasks, then an algorithmic technique based on a weighted sum of tasks, where priorities are translated to weights for tasks if necessary, can be used to prioritize environments. For an example of non-numerical priorities translated to weights—a high-priority task can have a weight of 3, a medium-priority task can have a weight of 2, and a low-priority task can have a weight of 1. Then, in this example, if E1 is associated with one high-priority task and E2 is associated with two low-priority tasks, then a priority for E1 can be equal to 3 (the weight of the one high-priority task for E1), a priority for E2 can be equal to 2 (the sum of the weights of the two low-priority tasks for E2), and so E1 could be prioritized over E2. In some embodiments, task priorities can be associated with objectives for the configuration; then, the priorities of the tasks can be associated and/or act as weights/scores for objectives for the configuration.

As mentioned above, environmental inputs 1412 can specify one or more environments in two dimensions and/or in three dimensions; e.g., using X, Y, and/or Z axes. A two-dimensional or three-dimensional environment can be divided into two-dimensional task-associated regions and a three-dimensional environment can be divided into three-dimensional task-associated volumes. A task-associated region or volume of the environment can be a respective region or volume of the environment that the robotic device is expected to reach (i.e., travel through and/or otherwise operate in) while performing at least one task of the one or more tasks. For example, a task-associated region or volume associated with a vacuuming task can include a floor of an environment. As another example, the task of emptying a dishwasher can include multiple task-associated regions or volumes that include one or more regions and/or volumes surrounding the dishwasher, one or more regions and/or volumes where the robotic device moves to empty the dishwasher, and one or more regions and/or volumes that include storage locations, such as cupboards, drawers, or cabinets, where objects removed from the dishwasher are stored.

The task-associated regions or volumes can be stored using data structures, software objects, and/or other software entities. For example, a spatial index and/or spatial database can be used to store and subdivide a two-dimensional or three-dimensional environment into task-associated regions and/or task-associated volumes. The spatial index and/or spatial database can rely on data structures such as, but not limited to, one or more grids, matrices, quadtrees, octrees, UB-trees, R-trees, k-d trees, m-trees, voxel-based data structures, binary space partitions, and related variants of these data structures (e.g., sparse matrices, R* trees) to store the task-associated regions and/or task-associated volumes.

In cases where the one or more tasks include multiple tasks, a task-associated region or volume can be subdivided by additional tasks. For example, a vacuuming task can be associated with at least two task-associated regions or volumes: a task-associated region or volume that includes a floor of the environment, and a task-associated region or volume above the floor of the environment. Then, if a task of emptying a dishwasher in the environment is to be performed, the task-associated region or volume that includes the floor of the environment can be subdivided into one or more task-associated regions or volumes of the floor near the dishwasher, one or more task-associated regions or volumes of the floor that are near storage locations, and one or more task-associated regions or volumes of the floor that are neither near the dishwasher nor near storage locations.

The task-associated regions and/or volumes can be prioritized on a per-task basis. For example, a task-associated region or volume can have a binary priority for task-associated regions or volumes related to a particular task. The binary priority indicates whether or not the robotic device is expected to (or does) reach a task-associated region or volume during performance of a particular task. More specifically, the binary priority of a task-associated region or volume is 1 if a robotic device is expected to (or does) reach the task-associated region or volume during performance of a particular task, and the binary priority of the task-associated region or volume is 0 if the robotic device is not expected to (or does not) reach the task-associated region or volume during performance of the particular task.

As another example, a multi-valued priority can be used for task-associated regions or volumes related to a particular task. In particular, a multi-valued priority can include a high priority if the robotic device is very likely to reach the task-associated region or volume during performance of the particular task, a medium priority if the robotic device is somewhat likely to reach the task-associated region or volume during performance of the particular task, a low priority if the robotic device is unlikely to reach the task-associated region or volume during performance of the particular task, and a zero priority if the robotic device will not reach the task-associated region or volume during performance of the particular task.

As a more specific example, a task-associated region or volume that includes a floor of the environment can have a high priority for a vacuuming task and a medium or lower priority for accomplishing a task of emptying a dishwasher depending on where the robot travels (using the floor) within the environment to empty the dishwasher; e.g., a portion of the floor near the dishwasher can have a high priority while a portion of the floor that traversed while emptying the dishwasher can have a low or even zero priority. Continuing this example, a task-associated region or volume associated with a cupboard above the floor can have a low or zero priority for the vacuuming task and a have a medium or higher priority for the task of emptying the dishwasher.

An operability score for each task-associated region or volume can be determined. The operability score can be a value that assesses how likely the robotic device is to reach the task-associated region or volume during performance some or all of the one or more tasks. The operability score for a task-associated region or volume can be based on the per-task priorities of the task-associated region or volume. That is, the operability score for each task-associated region or volume can be determined can be determined as a sum, or other numerical combination (e.g, an average, a weighted average, a product) of the per-task priority values of the task-associated regions or volumes. In some embodiments, operability scores can be normalized.

For example, if binary priorities are used, a sum of the binary priorities over all tasks for a particular task-associated region or volume can be used as the operability score for the particular task-associated region or volume. As a more particular example, suppose the one or more tasks included ten tasks and the corresponding binary per-task priorities for a task-associated region or volume TAV0 are: 0 1 1 0 1 1 0 1 1 0. Then, the sum of the binary per-task priorities for TAV0 equals 6, which indicates that six of the ten tasks reach TAV0. The sum of the binary per-task priorities can be normalized based on a highest sum of the binary per-task priorities, the total number of tasks, or another value. For example, if the sum of the binary per-task priorities is normalized based on the total number of tasks, the normalized sum would be 6/10=0.6. The sum of 6 or the normalized sum of 0.6 can then be used as the operability score for TAV0.

As another example, the task-associated region or volume can be scored using a multi-valued priority scheme using a 3-2-1-0 scale of priorities, where a high priority for a task has a value of 3, a medium priority for a task has a value of 2, a low priority for a task has a value of 1, and a zero priority for a task has a value of 0. Other example scales of priorities can use different values than used in the 3-2-1-0 scale.

In the 3-2-1-0 scale example, a sum of the 3-2-1-0 scaled priorities over all tasks for a particular task-associated region or volume can be used as the operability score for the particular task-associated region or volume. For example, if a task-associated region or volume TAV1 includes a floor near to a dishwasher, TAV1 can have a high priority for both a vacuuming task and an emptying the dishwasher task, and so TAV1 can have an operability score of 3 (for high priority to vacuuming)+3 (for high priority to emptying the dishwasher)=6. Another task-associated region or volume TAV2 that includes a floor associated with an above-the-floor storage location can have a high priority for the vacuuming task and medium priority for the emptying the dishwasher task, and so TAV2 can be have an operability score of 3 (for high priority to vacuuming)+2 (for medium priority to emptying the dishwasher)=5.

Another task associated region or volume TAV3 that includes the above-the-floor storage location can have an operability score of 0 (for zero priority to vacuuming) and 2 (for medium priority to emptying the dishwasher)=2. In some embodiments, task-associated regions or volumes of an environment can be determined that take into account all of the one or more tasks and an operability score for each of the task-associated regions or volumes can be determined.

The operability score can take a priority of a task into account. For example, suppose task priorities are assigned based on the 3-2-1-0 scale as well. Then, for a task-associated region or volume TAV4 that has a low priority for a high priority task and has a medium priority for a low-priority task, the operability score for TAV4 can be 1*3 (for the high priority task)+2*1 (for the low-priority task, which equals 5.

In some cases, an operability score for a task-associated region or volume can include values related to manipulability, dexterity, and/or ranges of motion within the task-associated region or volume. For example, the operability score for a task-associated region or volume can include one or more factors that is/are based on one or more manipulability index values in the task-associated region or volume—manipulability index values are discussed above in the context of FIG. 12. As another example, an operability score for a task-associated region or volume can include one or more factors that is/are based on an expected range (or ranges) of motion usable for completing one or more tasks within the task-associated region or volume. More particularly, suppose one of the one or more tasks involves cleaning of a surface in an environment, such as a counter top of a kitchen. Then, the operability score can include factor(s) that relate to a range (or ranges) of motion of a robotic device within a task-associated region or volume that includes the surface in the environment.

Then, the operability scores for task-associated regions or volumes can be used to constrain and/or select a configuration. For example, if a configuration of a robotic device cannot be used (i.e., due to being too large, too small, or otherwise unusable) in a task-associated region or volume having a relatively-high operability score, that configuration can be discarded. As another example, a robotic device and/or components of a robotic device can be selected that enable the robotic device to operate in task-associated region(s) or volume(s) that have relatively-high operability score(s). For example, if a task-associated region or volume TAV_HIGH that has relatively-high operability score has a height that is X inches (or Y centimeters) tall and that is bounded by permanent objects in the environment (e.g., bounded above by a table or desk and below by a floor), then the robotic device and/or components of the robotic device can be selected to be smaller than X inches (or Y centimeters) to enable the robotic device to reach TAV_HIGH during task performance.

Task-associated regions or volumes can be associated with components as well. For example, example task-associated regions or volumes TAV1 and TAV2 mentioned above can be associated with components for moving the robot, for cleaning (vacuuming) the floor, for taking objects out of the dishwasher, and for grasping the objects, and TAV3 can be associated with components for moving the robot, for grasping the objects, and for placing grasped objects into the above-the-floor storage location. As another example, if the robotic device is unlikely to reach into task-associated region or volume TAV_HIGH (e.g., the robotic device is too big to fit into TAV_HIGH), then a configuration of the robotic device can include effectors, joints, and links that enable the robotic device to perform tasks in TAV_HIGH while the robotic device remains outside of TAV_HIGH. Many other examples of task-associated regions or volumes, priorities of task-associated regions or volumes, and operability scores are possible as well.

In cases where no configurations of robotic devices can be determined that satisfy all constraints indicated by task inputs 1410, environmental inputs 1412, and user constraint inputs 1414, then environmental constraints and objectives (ECO) 1452 associated with relatively-low-priority environments can be relaxed and/or eliminated. Then, a search for configurations of robotic devices that satisfy the now-relaxed constraints can be performed.

In other embodiments, environmental inputs 1412 can be processed to convert environmental identifiers used by external devices to environmental identifiers used by computing device 1400 and/or robot configuration software 1420 such as discussed above in the context of task inputs 1410.

User constraint inputs 1414 can provide information about user-specified constraints about a robotic device. In examples discussed above in the context of FIG. 5, the information about user-specified constraints can include constraints related to tasks (e.g., a minimum amount of weight that a robotic device can carry to perform carrying and/or other tasks, a longest reach value that a robotic device has to make to perform cleaning and/or other tasks). Other information about user-specified constraints can include, but is not limited to, information about cost-based constraints (e.g., the robotic device has to cost less than $x), component-based constraints (e.g., the robotic device has to include a link L1), environmental-based constraints (e.g., the robotic device has to be able to move on an icy surface), dimension-based constraints (e.g, the robotic device has to be less than 2 meters tall, the robotic device has to be at least 20 kilograms in weight) and combinations of these types of constraints (e.g., the robotic device has to be able to clean a floor in a space between a filing cabinet and a desk). Then, a requested configuration of a robotic device should be able to meet some, and perhaps all, constraints specified using user constraint inputs 1414.

In some embodiments, when multiple constraints are specified, one or more constraints can be prioritized over other constraints. Constraints can be prioritized based on user input; e.g., in a similar fashion as tasks are prioritized in FIG. 3B, based on related objectives; e.g., a constraint related to a relatively-highly weighted objective can be prioritized over a constraint related to a relatively-lowly weighted objective; and/or using numerical techniques. One numerical technique is to determine a number of additional robotic device configurations available when a related user constraint is relaxed or eliminated. For example, if eliminating a user constraint based on a weight of a robotic device allows searching through 50 additional robotic device configurations, while eliminating a constraint based on a height of a robotic device allows searching through 75 additional robotic device configurations (or vice versa), then eliminating or relaxing the height-based constraint can be prioritized over eliminating or relaxing the weight-based constraint (or vice versa).

In cases where no configurations of robotic devices can be determined that satisfy all constraints indicated by task inputs 1410, environmental inputs 1412, and user constraint inputs 1414, then user constraints can be relaxed and/or eliminated based on priorities of user constraints. In particular of these cases, combinations of task-based constraints, environmentally-based constraints, and user constraints can be related and/or eliminated. Then, a search for configurations of robotic devices that satisfy the now-relaxed constraints can be performed.

In other embodiments, user constraint inputs 1414 can be processed to convert user constraint information specified by external devices to user constraint information used by computing device 1400 and/or robot configuration software 1420.

FIG. 14 shows that task inputs 1410 can be provided to task/component module 1430, which can determine one or more components of a robotic device that can carry out one or more tasks that were specified using task inputs 1410. Similarly, environmental inputs 1412 can be provided to environment/component/objective module 1450, which can determine one or more components of a robotic device that can be used to perform one or more tasks in one or more environments and/or one or more objectives associated with the one or more tasks, where the environment(s) were specified using environmental inputs 1412.

Both task/component module 1430 and environment/component/objective module 1450 can generate one or more lists of components suitable for representing one or more components 1432. In some embodiments, a list of components can be associated with one or more sources, such as but not limited to task inputs, environmental inputs, user constraint inputs, task identifiers and environmental identifiers, for the list of components. For example, if a task T1 can be accomplished by each component in a list of components LC1, then a source for list of components LC1 can be task T1 and/or an identifier associated with task T1. Further, multiple sources for some lists of components can be determined. For example, if list of components LC1 with a source of task T1 were to be combined with list of components LC2 with a source of environmental input E1, then a combined list LC3 of LC1 and LC2 can have two sources: task T1 and environmental input E1. Many other examples of sources of lists of components are possible as well.

Components 1432 can be selected by task/component module 1430 to accomplish one or more tasks. Components 1432 can be selected singly or in combination; for example, a vacuum cleaning task may be completed using one component; e.g., a mobile robotic base with a built-in vacuum cleaner. As another example, the vacuum cleaning task may be completed using a group of components such as an arm and a gripper actuator, where the arm can itself be a group of one or more components, such as links and/or joints, that can be assembled to form the arm and to enable the gripper actuator to be moved and used at an end of the arm to grasp and maneuver a vacuum cleaner to perform the vacuum cleaning task. Many other examples of single components and groups of components that can be used to accomplish one or more tasks are possible as well.

Components 1432 can be selected by environment/component/objective module 1450 to operate in one or more environments. For example, if an environment specified by environmental inputs 1412 includes stairs, then movement components such as leg-like components or other types of components that can be used to navigate the stairs can be selected by environment/component/objective module 1450 to operate in the environment. As another example, if an environment specified by environmental inputs 1412 involves partial or complete submersion of the robotic device in water; e.g., in an underwater or outdoor environment, then water-resistant and/or waterproofing components, such as water-tight robotic bodies, gaskets, and/or waterproofed components can be specifically selected by environment/component module/objective module 1450 as components 1432.

Components 1432 can be determined using component database (CDB) 1438. Component database 1438 can be accessed by queries specifying one or more component criteria, such as: component identifiers; e.g., to allow for user-selection of components, types of components; e.g., a query for links, joints, and/or actuators, task identifiers, environmental identifiers, dimensions; e.g., sizes, weights, and/or other criteria. In some examples, one or more queries specifying one or more component criteria can include one or more component criteria specified using data from task inputs 1410 and/or 1434. After receiving the query with the one or more component criteria, component database 1438 can return a list of one or more components that meet the one or more component criteria. In some embodiments, use of component database 1438 can involve connecting to component database 1438 prior to communication with (e.g., querying) component database 1438.

The returned list of component(s) can include information about single components and/or collections of components that meet the one or more component criteria. For example, if a query is for a link that is at least 36 inches long, the returned list of components can include information about a single link that is 40 inches long and an arm assembly that includes the 40-inch long link. In some cases, the list of components can include information associating components with one or more configurations and/or arrangements; e.g., information indicating that the single link that is 40 inches long can be used with configurations 1, 2, and 7 for robotic devices and/or with robotic devices that are based on arrangements 4, 6, and 33. Many other examples of components, criteria, and queries are possible as well. In some embodiments, component database 1438 can be distinct from robot configuration software 1420; e.g., implemented using data and/or software distinct from robot configuration software 1420.

Also, constraints and/or objectives can be determined based on task inputs 1410 and/or environmental inputs 1412. In some embodiments, such as indicated by component/constraint/objective module 1440, task and/or environmental inputs can be processed by one module; e.g., module 1430 or 1450, to determine lists of components, which are then analyzed by component/constraint/objective module 1440 to determine component-related constraints and objectives (CCO) 1442. In other embodiments, such as indicated by environment/component/objective module 1450, inputs such as environmental inputs 1412 can be analyzed directly by environment/component/objective module 1450 to determine constraints and objectives such as environmental constraints and objectives 1452.

Component constraints and objectives 1442 can be constraints and objectives on one or more components, such as, but not limited to, goal-based objectives associated with one or more goals, task-based objectives associated with one or more tasks, cost-based constraints, weight-based constraints, size-based constraints, power-usage-based constraints, other power-based constraints (e.g., constraints on a minimum or maximum amount of power provided by one or more constraints), and torque-based constraints. Objectives and constraints can also arise due to components—for example, an condition for a robotic device that a frame that supports the robotic device can support a maximum MAXW pounds of weight in operation can lead to a constraint that the sum of weights of all other components to be less than MAXW pounds. Further, if a goal-based or task-based objective indicates that the robotic device has to be able to support at least TASKW pounds, then these objective(s) can lead to a constraint that all components other than the frame have to weigh less than MAXW−TASKW pounds.

In some examples, an initially-selected component or set of components can be replaced by one or more replacement components. An initial component or set of components can be selected as part or all of components 1432. Then, one or more criteria associated with the initial component or set of components can be determined; e.g., criteria based on component constraints and objectives 1442, where the initial component or set of components can have a first range of motion. One or more replacement components can be determined that have the first range of motion. Then, a determination can be made whether or not to replace the initial component or set of components with the replacement component(s) based on the criteria. For example, the replacement component(s) can be selected based on cost criteria (e.g., the replacement component(s) are less expensive than the initial component(s)), size criteria, weight criteria, reliability criteria (e.g., the replacement component(s) are more durable than the initial component(s)), component availability criteria (e.g., the replacement component(s) are available now, while the initial component(s) are not currently available) and/or other criteria. Then, after determining to replace the initial components based on the one or more criteria, the replacement component(s) can replace the initial components in components 1432.

As another example, the initial component or set of components in components 1432 can have one or more ranges of manipulability or motion associated with one or more manipulability tasks. One or more replacement components can be determined that have the range(s) of manipulability or motion. Then, a determination can be made whether or not to replace the initial component or set of components with the replacement component(s) based on the criteria discussed in the paragraph immediately above. Then, after determining to replace the initial components based on the one or more criteria, the replacement component(s) can replace the initial components in components 1432.

In other examples, replacing component(s) in components 1432 with replacement component(s) that have a particular range (or ranges) of motion or manipulability can lead to changing an arrangement for the robotic device. For example, a particular arrangement can be selected for components 1432, but the particular arrangement may not be feasible when using the replacement component(s), or may not be expected to perform some or all manipulability tasks. Then, upon adding the replacement components to components 1432, the particular arrangement may be replaced with another arrangement that feasibly utilizes the replacement component(s) and the other components of components 1432. Of course, if the particular arrangement can feasibly utilize the replacement component(s) and the other components of components 1432, the particular arrangement may be maintained (not replaced) upon selection of the replacement component(s). In more particular examples, the particular arrangement can be modified to accomplish one or more manipulability tasks; e.g., an arrangement that allows for one or more optional components can be modified to make the optional component(s) mandatory when the previously-optional component(s) are determined to be required to accomplish one or more manipulability tasks. Many other examples of modifying components 1432 and arrangements are possible as well.

Environmental constraints and objectives 1452 can be constraints and objectives on one or more components and/or arrangements based on one or more environments specified by environmental identifiers and/or environmental inputs 1412. Environmental constraints and objectives 1452 can include the types of constraints and objectives described above as component constraints and objectives 1442; e.g., goal-based objectives, task-based objectives, cost-based constraints, etc. as well as environmentally-based constraints, such as constraints based on objects in the environment such as stairs, distances, temperature, humidity, waterproofing, chemical exposure, and radiation. Constraints based on user constraint inputs 1414 can include the types of constraints described as environmental constraints and objectives 1452, as well as any other types of constraints presented for user input.

In some embodiments, some or all of component constraints and objectives 1442, environmental constraints and objectives 1452, and constraints and objectives based on user constraint inputs 1414 can be associated with one or more sources, such as but not limited to task inputs, environmental inputs, user constraint inputs, task identifiers and environmental identifiers, for the constraint. For example, if a component C1 leads to a component constraint CC1, then a source for component constraint CC1 can be component C1. Further, multiple sources for some constraints can be determined. For example, if a task T1 leads to addition of component C1 to components 1432, which in turn leads to component constraint CC1 of component constraints and objectives 1442, component constraint CC1 can be considered to have at least two sources: component C1 and task T1. Many other examples of constraint sources are possible as well.

Robot design module 1460 can receive inputs including information about components, such as components 1432, and information about constraints, such as component constraints and objectives 1442, environmental constraints and objectives 1452, and constraints based on user constraint input 1414. Based on these inputs, robot design module 1460 determines one or more arrangements, shown in FIG. 14 as arrangement information 1462 that can utilize some or all of components 1432. Components 1464 can be a subset of components 1432 used in arrangement(s) in arrangement information 1462.

Robot design module 1460 can examine the information about components and determine whether one or more configurations of robotic devices can accomplish the one or more tasks specified using the task inputs 1410. For example, robot design module 1460 can examine information associating components with configurations and/or arrangements for all components in a list of components associated with a source task to determine a list of all configurations and/or arrangements associated with the list of components. If the source task is the only task specified by task inputs 1410, then the list of all configurations and/or arrangements can be provided as arrangement information 1462 as a list of all configurations and/or arrangements that can be used to accomplish the source task.

However, if multiple source tasks are specified by task inputs 1410, then lists of components whose sources are the respective source tasks can be combined and a list of all configurations and/or arrangements associated with the combined list of components can be determined. For example, suppose task inputs 1410 specify two tasks T11 and T12. Then, task/component module 1430 can generate a list of components LC11 whose source is task T11 and a list of components LC12 whose source is task T12. An intersection of the two lists of components LC11 and LC12 can be taken to generate combined list of components CLC1. Then, for each component in CLC1, the information associating components with configurations and/or arrangements can be examined to determine configurations and/or arrangements associated with the component. A union or concatenation of the information about configurations and/or arrangements associated with each component can be determined for use as arrangement information 1462. Further, part or all of combined list CLC1 can be used as component information 1464. Other techniques for determining configurations and/or arrangements based on components are possible as well.

Constraints and objectives (consts/objs) 1466 can be a combination, such as a union or concatenation, of component constraints and objectives 1442, environmental constraints and objectives 1452, and constraints and objectives based on user constraint input 1414, and can include information about constraint sources for some or all of constraints and objectives 1466. Visualization information 1468 can be a list of instructions related to images to be generated for arrangements and/or configurations provided in arrangement information 1462, components provided in component information 1464, and/or constraints and objectives provided in constraints and objectives 1466. Instructions related to images can include but are not limited to instructions to generate simulations, movement images, manipulability graphs, images of components, and images of robotic devices. In some examples, the instructions related to images in visualization information 1468 can vary based on components and/or configurations of robotic devices; e.g., a configuration for a robotic device with a relatively large number of components and/or with the ability to carry out a relatively large number of tasks can include more images, and correspondingly more instructions related to images, than a robotic device with a relatively small number of components and/or with the ability to carry out a relatively small number of tasks. Other arrangement information 1462, component information 1464, constraints and objectives 1466, and/or visualization information 1468 are possible as well.

Design validation module 1480 can be used to verify that one or more arrangements indicated in arrangement information 1462 using components provided in component information 1464 can satisfy constraints and objectives 1466. If design validation module 1480 determines that an arrangement A1 indicated in arrangement information 1462 can satisfy all of constraints and objectives 1466, then design validation module 1480 can indicate that arrangement A1 is a validated arrangement; otherwise, the design validation module 1480 can indicate that arrangement A1 is an invalid arrangement and perhaps indicate which constraint(s) of constraints and objectives 1466 are not satisfied by arrangement A1. In some embodiments, design validation module 1480 can determine an arrangement score for an arrangement, where the score can be based on objectives in constraints and objectives 1466; e.g., an arrangement score based on how many objectives in constraints and objectives 1466 can be met by an arrangement; an arrangement score based on a weighted sum or average of objectives in constraints and objectives 1466 that can be met by an arrangement.

Design validation module 1480 can generate validation data 1470 to indicate which, if any, arrangements indicated in arrangement information 1462 are validated arrangements. If no arrangements of arrangement information 1462 are validated, then validation data 1470 can be provided to robot design module 1460 with information about one or more constraints that are not satisfied by the arrangements indicated in arrangement information 1462. In particular embodiments, an arrangement can be validated based on the arrangement score; e.g., an arrangement can be determined to be valid if its arrangement score exceeds a predetermined threshold value (such as a threshold value of 30, 54, or 80) or percentage (e.g., 50%, 75%, or 80% of a maximum possible arrangement score value).

Validation data 1470 generated by design validation module 1480 about unsatisfied constraint(s) (if any) can be part of a feedback loop to regenerate arrangement information 1462. That is, validation data 1470 can be communicated from design validation module 1480 to robot design module 1460 to regenerate arrangement information 1462 with arrangement(s) that may be able to satisfy all of the constraints other than the unsatisfied constraint(s) indicated in validation data 1470.

More specifically, robot design module 1460 can use validation data 1470 to determine source(s) of constraint(s) not satisfied by arrangement(s) indicated by arrangement information 1462. By examining the source(s) of unsatisfied constraint(s) indicated by validation data 1470, robot design module 1460 can determine tasks, components, and/or environmental conditions that lead to the unsatisfied constraint(s). Then, tasks leading to unsatisfied constraint(s) can be provided to task/component module 1430 to modify task inputs 1410; e.g., to remove the tasks leading to unsatisfied constraint(s) from task inputs 1410. Additionally, environmental sources leading to unsatisfied constraint(s) can be provided to environment/component/objective module 1450 to modify environmental inputs 1412; e.g., to remove the environmental sources leading to unsatisfied constraint(s) from environmental inputs 1412. If robot design module 1460 determines that one or more arrangement(s) indicated by arrangement information 1462 and/or one or more components indicated by component information 1464 lead to the unsatisfied constraint(s), then robot design module 1460 can modify arrangement information 1462 and/or component information 1464 in attempting to satisfy the unsatisfied constraint(s) of constraints and objectives 1466.

After task inputs 1410 and/or environmental inputs 1412 are modified by robot design module 1460 to generate modified task inputs 1434 and/or modified environmental inputs 1436, task component module 1430 and environment/component/objective module 1450 can operate on modified task inputs 1434 and/or modified environmental inputs 1436 to generate components 1432, component constraints and objectives 1442, and environmental constraints and objectives 1452 as discussed above with respect to task/component module 1430, component/constraint/objective module 1440, and environment/component/objective module 1450.

The newly-generated components 1432, component constraints and objectives 1442, and environmental constraints and objectives 1452 can be provided to robot design module 1460 to generate arrangement information 1462, component information 1464, constraints and objectives 1466, and validation information 1468 as discussed above. The newly-generated arrangement information 1462, component information 1464, constraints and objectives 1466, and validation information 1468 can then be provided to design validation module 1480 for validation, thus closing the feedback loop started by generation of validation data 1470.

If validation data 1470 indicates that one or more arrangements indicated in arrangement information 1462 are validated arrangements, then validation data 1470 may not be provided to robot design module 1460. Rather, design validation module 1480 can generate arrangement information 1484, component information 1486, and visualization information 1488 by screening respective inputs arrangement information 1462, component information 1464, and visualization information 1488 to remove any visualization information not associated with a validated arrangement. The screened inputs can then be provided as arrangement information 1484, component information 1486, and visualization information 1488 to visualization module 1490. In some examples, arrangement information 1484 can indicate that multiple arrangements are validated arrangements; while in other examples, arrangement information 1484 can indicate that only one arrangement has been validated. In still other examples, arrangement information 1484 can include arrangement scores for one or more arrangements.

One or more validation techniques can be used by design validation module 1480 to determine which, if any, arrangements indicated in arrangement information 1462 are validated arrangements. A first validation technique can utilize validation database 1482 to determine whether a given arrangement A2 is valid. Validation database 1482 can store and provide data about whether or not a component, configuration or arrangement can satisfy a constraint. Then, design validation module 1480 can loop through the constraints in constraints and objectives 1466 to determine whether a particular arrangement A2 is valid. For example, design validation module 1480 can take the following actions:

(1) initialize data D1=TRUE, indicating that arrangement A2 is currently valid;
(2) LOOPSTART: select a constraint C of constraints and objectives 1466 that has not be examined,
(3) obtain data from validation database 1482 about whether or not arrangement A2 can satisfy constraint C,
(4) use the data from (3) to determine whether arrangement A2 can satisfy constraint C,
(5) if arrangement A2 can satisfy constraint C:
  (a) indicate constraint C has been examined, and
  (b) return to LOOPSTART to examine another constraint until all constraints in constraints and objectives 1466 are examined. If all constraints are examined go to LOOPEND
(6) if arrangement A2 cannot satisfy constraint C:
  (a) set data D1=FALSE, indicating that arrangement A2 is invalid; and
  (b) go to LOOPEND (7) LOOPEND: If D1=TRUE, then design validation module 1480 can indicate arrangement A2 is a validated arrangement. If D1=FALSE then design validation module 1480 can indicate arrangement A2 is an invalid arrangement.

A second validation technique can involve solution of an optimization problem:
maximize $f_{OBJ}(A3)$
subject to C
where:
$f_{OBJ}(A3, L3)$ is an objective function relating to performance of all tasks specified in task inputs 1410 by a robotic device having a given arrangement A3 of a given list of components L3; and
C is a set of constraints indicated by constraints and objectives 1466.

In some examples, $f_{OBJ}(A3)$ can be based on one or more objectives in constraints and objectives 1466; e.g., $f_{OBJ}(A3)$ can determine an arrangement score based on the one or more objectives.

If constraints C solely include linear constraints, then the optimization problem may be solved by a linear programming or other linear solution technique. If constraints C include non-linear constraints, then non-linear techniques may be used to solve the optimization problem. If the optimization problem can be solved for a particular arrangement, then design validation module 1480 can determine that the particular arrangement is valid. However, if the optimization problem cannot be solved for any arrangement indicated by arrangement information 1462, then design validation module 1480 can determine that all arrangements indicated by arrangement information 1462 are valid. In some embodiments, the optimization problem can be formulated as a minimization problem rather than a maximization problem as indicated above.

Design validation module 1480 can loop through all arrangements specified in arrangement information 1462 and execute the first and/or second validation techniques discussed immediately above to determine whether or not each arrangement is valid. After design validation module 1480 has determined whether or not all arrangements are valid or invalid, design validation module 1480 can determine if any arrangements are valid.

If at least one arrangement is valid, then design validation module 1480 can screen respective inputs arrangement information 1462, component information 1464, and visualization information 1488 to generate respective outputs arrangement information 1484, component information 1486, and visualization information 1488 to include information only about the validated arrangements as discussed above. However, if none of the arrangements specified in arrangement information 1462 are determined to be valid, then validation data 1470 can provide validation data 1470 about constraints that were unsatisfied by the arrangements to start the feedback loop mentioned above; e.g., by storing information about unsatisfied constraints at action number (6) above and/or looping through all constraints even after an arrangement has been determined to be invalid and selecting constraints that were not satisfied by some or all arrangements in validation data 1470 and providing validation data 1470 to robot design module 1460.

After validation by design validation module 1480, arrangement information 1484, component information 1486, and visualization information 1488 are provided to visualization module 1490. Visualization module 1490 can determine one or more images as specified by instructions in visualization information 1488. Additional details about instructions in visualization information 1488 can be found provided in the discussion of visualization information 1468.

Visualization module 1490 can determine the specified image(s) by generating and/or obtaining (e.g., retrieving from a database storing imagery) video and/or still images related to one or more robotic devices specified using arrangement information 1484 and component information 1486. The image(s) can be generated by rendering still and/or video images, perhaps using techniques to simulate components of and/or entire robotic device(s) specified using arrangement information 1484 and component information 1486. Other techniques for determining the specified image(s) are possible as well.

Once the image(s) have been determined, visualization module 1490 can provide the specified image(s), shown as image(s) 1492 in FIG. 14, as well as arrangement information 1484 and component information 1486, as outputs of computing device 1400 and robotic configuration software 1420.

Figure 15:
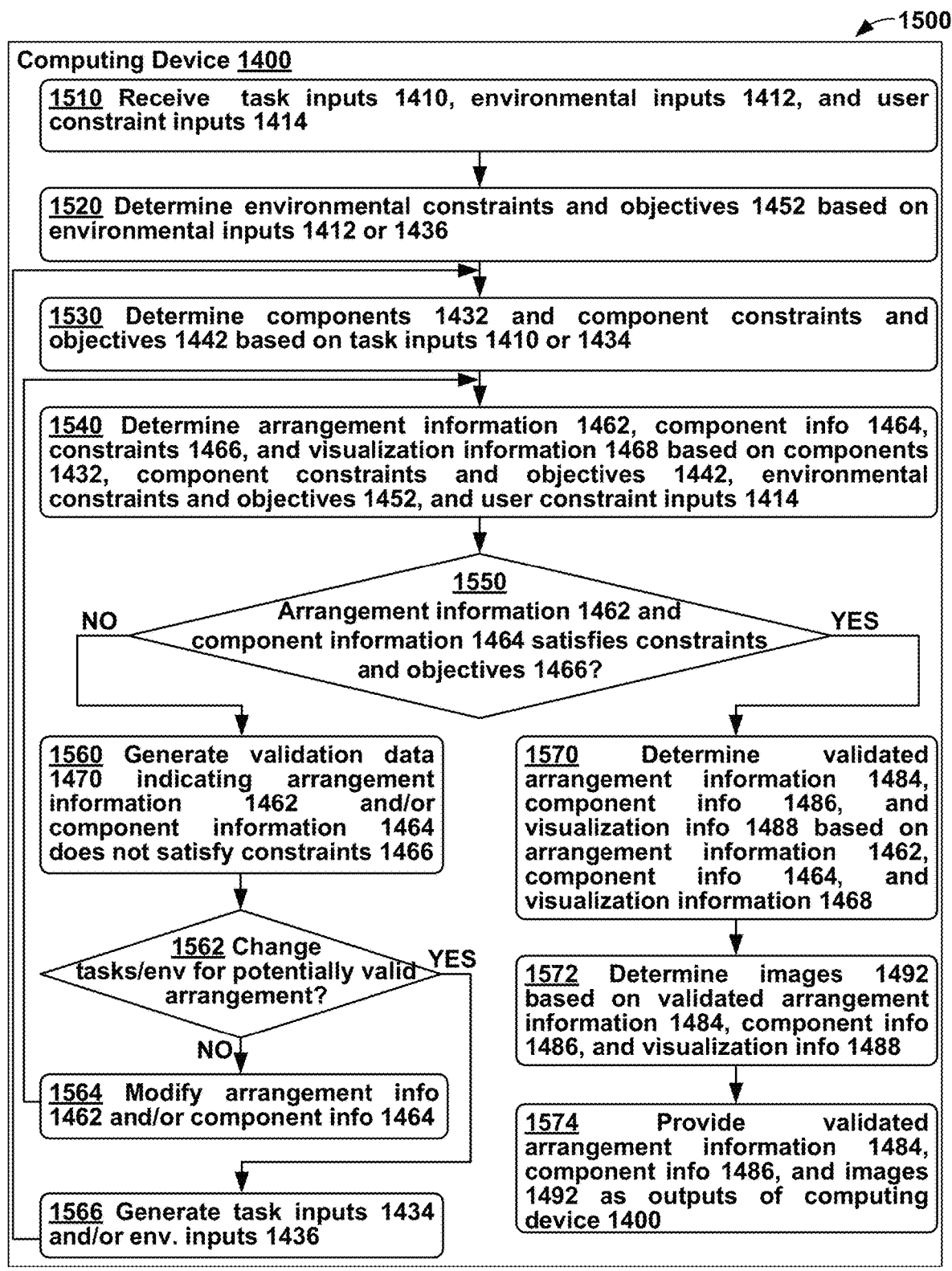
FIG. 15 is a flowchart of a method, in accordance with an example embodiment.

FIG. 15 is a flowchart of method 1500, in accordance with an example embodiment. Method 1500 can be carried out by a computing device, such as computing device 1400. Method 1500 can begin at block 1510, where computing device 1400 can receive task inputs 1410, environmental inputs 1412, and user constraint inputs 1414. Task inputs 1410, environmental inputs 1412, and user constraint inputs 1414 are discussed in more detail above at least in the context of FIG. 14.

At block 1520, computing device 1400 can determine environmental constraints and objectives 1452 based on environmental inputs 1412 or 1436. For example, computing device 1400 can use environment/component/objective module 1450 to determine constraints on one or more components and/or arrangements based on one or more environments specified by environmental identifiers and/or environmental inputs 1412 or 1436 as discussed above at least in the context of FIG. 14.

At block 1530, computing device 1400 can determine components 1432 and component constraints and objectives 1442 based on task inputs 1410 or 1434. For example, computing device 1400 can use task/component module 1430, component database 1438, and/or component/constraint/objective module 1440 to generate components 1432 and component constraints and objectives 1442 based on task inputs 1410 or 1434 as discussed above at least in the context of FIG. 14.

At block 1540, computing device 1400 can determine arrangement information 1462, component info 1464, constraints and objectives 1466, and visualization information 1468 based on components 1432, component constraints and objectives 1442, environmental constraints and objectives 1452, and user constraint inputs 1414. For example, computing device 1400 can use robot design module 1460 to determine arrangement information 1462, component info 1464, constraints and objectives 1466, and visualization information 1468 as discussed above at least in the context of FIG. 14.

At block 1550, computing device 1400 can determine whether arrangement information 1462 and component information 1464 satisfies constraints and objectives 1466. For example, computing device 1400 can use design validation module 1480 to whether arrangement information 1462 and component information 1464 satisfies constraints and objectives 1466 as discussed above at least in the context of FIG. 14.

If computing device 1400 determines that arrangement information 1462 and component information 1464 does not satisfy constraints and objectives 1466, then method 1500 can proceed to block 1560. Otherwise, computing device 1400 can determine that arrangement information 1462 and component information 1464 satisfies constraints and objectives 1466, method 1500 can proceed to block 1570.

At block 1560, computing device 1400 can generate validation data 1470 indicating arrangement information 1462 and/or component information 1464 does not satisfy constraints and objectives 1466. For example, computing device 1400 can use design validation module 1480 to generate validation data 1470 indicating arrangement information 1462 and/or component information 1464 does not satisfy constraints and objectives 1466 as discussed above at least in the context of FIG. 14.

At block 1562, computing device 1400 can determine whether tasks and/or environmental conditions are to be changed to reach a potentially valid arrangement. For example, computing device 1400 can use robot design module 1460 to determine whether tasks and/or environmental conditions are to be changed to reach a potentially valid arrangement based on validation data 1470 as discussed above at least in the context of FIG. 14.

If computing device 1400 determines that tasks and/or environmental conditions are to be changed to reach a potentially valid arrangement, then method 1500 can proceed to block 1566. Otherwise, computing device 1400 can determine that tasks and/or environmental conditions are not to be changed to reach a potentially valid arrangement and method 1500 can proceed to block 1564.

At block 1564, computing device 1400 can modify arrangement info 1462 and/or component info 1464. For example, computing device 1400 can use robot design module 1460 to modify arrangement info 1462 and/or component info 1464 in attempting to satisfy unsatisfied constraints of constraints and objectives 1466, such discussed above at least in the context of FIG. 14. Upon completion of block 1564, method 1500 can proceed to block 1540.

At block 1566, computing device 1400 can generate modified task inputs 1434 and/or modified environmental inputs 1436 in an attempt to obtain one or more valid configurations of a robotic device that can perform one or more tasks represented by modified task inputs 1434, such as discussed above in the context of FIG. 14. After block 1566 is completed, method 1500 can proceed to block 1530.

In some embodiments, computing device 1400 can determine that modified task inputs 1434 represent zero tasks and/or otherwise determine that no valid configurations of a robotic device are available that can perform at least one task indicated by task inputs 1410. In these embodiments, computing device 1400 can then provide an indication that no valid configurations of a robotic device are available to perform at least one task specified by task inputs 1410 in the environment specified by environment inputs 1412 that satisfies user constraints specified by user constraint inputs 1414.

At block 1570, computing device 1400 can determine validated arrangement information 1484, component info 1486, and visualization info 1488 based on arrangement information 1462, component info 1464, and visualization information 1468. For example, computing device 1400 can use design validation module 1480 to determine validated arrangement information 1484, component info 1486, and visualization info 1488 based on arrangement information 1462, component info 1464, and visualization information 1468, such as discussed above at least in the context of FIG. 14.

At block 1572, computing device 1400 can determine images 1492 based on validated arrangement information 1484, component info 1486, and visualization info 1488 using computing device 1400. For example, computing device 1400 can use visualization module 1492 to determine images 1492 based on validated arrangement information 1484, component info 1486, and visualization info 1488, such as discussed above at least in the context of FIG. 14.

At block 1574, computing device 1400 can provide validated arrangement information 1484, component info 1486, and images 1492 as outputs. In some embodiments, upon completion of block 1574, method 1500 can end.

Figure 16:
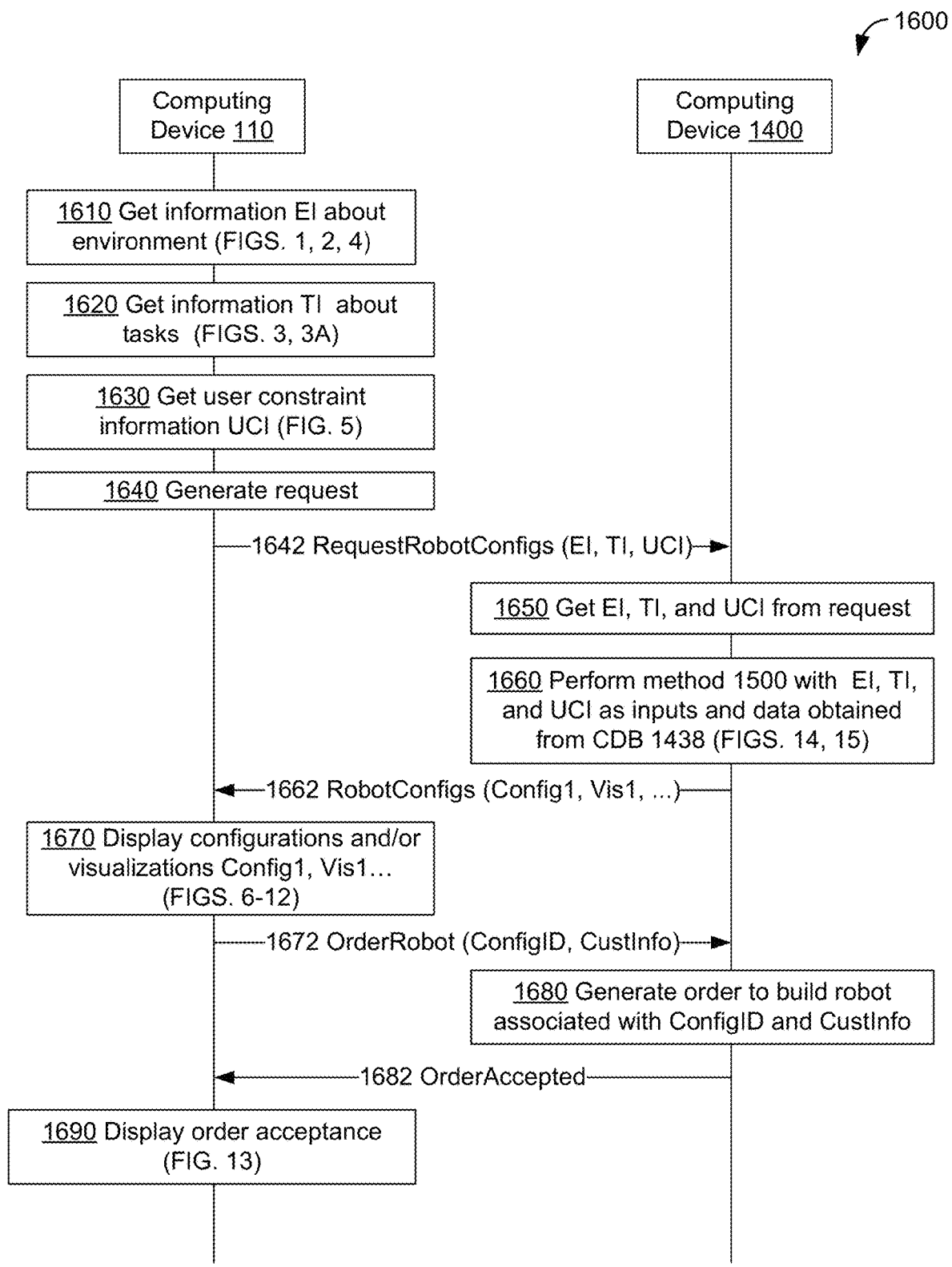
FIG. 16 is a diagram depicting communications flows during a scenario for ordering construction of a robotic device, in accordance with an example embodiment.

FIG. 16 is a diagram depicting communications flows during a scenario 1600 for ordering construction of a robotic device, in accordance with an example embodiment.

In scenario 1600, as with scenario 100, computing device 110 is utilized to order a robotic device. During scenario 1600, computing device 110 obtains information about an environment, tasks to be performed by a robotic device, and user constraints on the robotic device. Then, computing device 110 generates a request for robotic configurations based on the previously-obtained information and sends the request to computing device 1400. Computing device 1400 receives the request for robotic configurations and uses method 1500 to determine one or more configurations and related visualizations for robotic devices. Once determined, computing device 1400 sends the configurations and related visualizations to computing device 110. Computing device 110 displays the configurations and/or related visualizations Scenario 1600 starts with computing device 110 carrying out the procedures indicated at block 1610 to get information EI about an environment where a robotic device can be utilized, such as discussed above in more detail in the context of FIGS. 1, 2, and 4.

At block 1620, computing device 110 gets information TI about tasks that a robotic device can perform, such as discussed above in more detail in the context of FIGS. 3 and 3A.

At block 1630, computing device 110 gets user constraint information UCI indicating constraints on a robotic device, such as discussed above in more detail in the context of FIG. 5.

At block 1640, computing device 110 generates request 1642 for robotic configurations that is based on environmental information EI, task information TI, and user constraint information UCI obtained at blocks 1610, 1620, and 1630 respectively. Computing device 110 then sends request 1642 with EI, TI, and UCI to computing device 1400.

Computing device 1400 receives request 1642. Then, at block 1650, computing device 1400 determines task inputs 1410 from task information TI in request 1642, environmental inputs 1412 from environmental information EI in request 1642, and user constraint inputs 1414 from user constraint information UCI in request 1642. For example, task information TI can be used as task inputs 1410, environmental information EI can be used as environmental inputs 1412, and user constraint information UCI can be used as user constraint inputs 1414.

At block 1652, computing device 1400 can connect to component database 1438 in preparation for carrying out method 1500 (as part of block 1652). In some examples, computing device 1400 can already be connected to component database 1438 at a time of execution of block 1652, and/or not have to explicitly connect to component database 1438. In these examples, part or all of the procedures of block 1652 can be omitted.

At block 1660, computing device 1400 can execute method 1500 operating on task inputs 1410, environmental inputs 1412, and user constraint inputs 1414 and obtaining data from component database 1438 suitable for generating zero or more configurations of robotic devices represented as arrangement information 1482, component information 1484, and image(s) 1492, such as discussed above in the context of at least FIGS. 14 and 15.

In scenario 1600, computing device 1400 executes method 1500 to generate one or more configurations of robotic devices Config1 represented as arrangement information 1482 and component information 1484 of FIGS. 14 and 15 and one or more visualizations Vis1 represented as image(s) 1492 of FIGS. 14 and 15 Computing device 1400 then generates robot configurations message 1662 that includes configuration(s) of robotic device(s) Config1 and visualization(s) Vis1 and sends configurations message 1662 to computing device 110. Computing device 110 subsequently receives generates robot configurations message 1662 with Config1 and Vis1.

At block 1670, computing device 110 can display information about configuration(s) Config1 and some or all of the images in visualizations Vis1, as discussed above in the context of FIGS. 6-12. In scenario 1600, after displaying information about configuration(s) Config1 and images in visualizations Vis1, computing device 110 receives a request to order a robotic device based on a configuration in configuration(s) Config1. Upon receiving the request to order a robotic device, computing device 110 can generate order robot message 1672 to order construction of a robotic device based on a configuration specified using configuration identifier ConfigID that specifies the requested configuration in configuration(s) Config1 and perhaps customization information CustInfo for customizing the requested configuration; e.g., changing components in the requested configuration. Once generated, computing device 110 can send order robot message 1672 with ConfigID and CustInfo (if provided) to computing device 1400.

Upon reception of order robot message 1672, computing device 1400 can perform the procedures of block 1680 to generate an order to build a robotic device having a configuration associated with configuration identifier ConfigID that may be modified by customization info CustInfo. In scenario 1600, after the order to build a robotic device is generated, computing device 1400 provides the order to a robotic construction system, which can accept the order and provide an acknowledgement indicating order acceptance. Then, computing device 1400 can generate order accepted message 1682 and send the order accepted message 1682 to computing device 110.

Upon reception of order accepted message 1682, computing device 110 can perform the procedures of block 1690 to display an indication of order acceptance, such as discussed above in the context of FIG. 13. After displaying the indication of order acceptance, scenario 1600 can end.

Example Data Network

Figure 17:
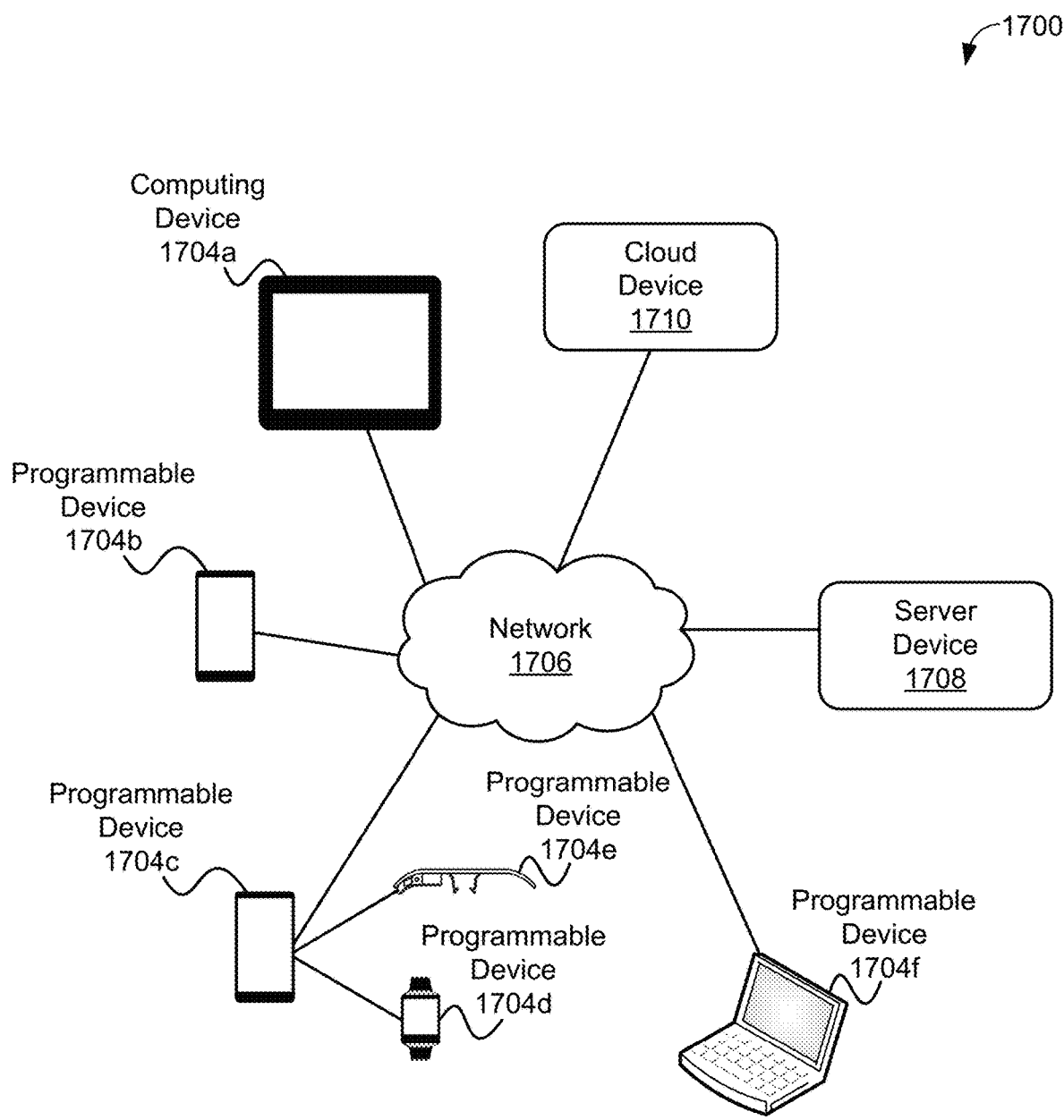
FIG. 17 depicts a distributed computing architecture, in accordance with an example embodiment.

FIG. 17 depicts a distributed computing architecture 1700 with server device 1708 and cloud device 1710 configured to communicate, via network 1706, with programmable devices 1704a, 1704b, 1704c, 1704d, 1704e, and 1704f, in accordance with an example embodiment. Network 1706 may correspond to a LAN, a wide area network (WAN), a corporate intranet, the public Internet, or any other type of network configured to provide a communications path between networked computing devices. Network 1706 may also correspond to a combination of one or more LANs, WANs, corporate intranets, and/or the public Internet.

Although FIG. 17 only shows six programmable devices, distributed application architectures may serve tens, hundreds, or thousands of programmable devices. Moreover, a programmable device, such as programmable devices 1704a, 1704b, 1704c, 1704d, 1704e, and 1704f (or any additional programmable devices), can be any sort of computing device. In some embodiments, such as indicated with programmable devices 1704a, 1704b, 1704c, and 1704f, programmable devices can be directly connected to network 1706. In other embodiments, such as indicated with programmable devices 1704d and 1704e, programmable devices can be indirectly connected to network 1706 via an associated computing device, such as programmable device 1704c. In this example, programmable device 1704c can act as an associated computing device to pass electronic communications between programmable devices 1704d and 1704e and network 1706. In still other embodiments not shown in FIG. 17, a programmable device can be both directly and indirectly connected to network 1706.

Server devices 1708 and cloud device 1710 can be configured to perform one or more services, as requested by programmable devices 1704a-1704f. For example, server device 1708 and/or cloud device 1710 can provide content as a service to one or more of programmable devices 1704a-1704f. The content can include, but is not limited to, web pages, hypertext, scripts, configuration data sets, binary data such as compiled software, images, audio, and/or video. The content can include compressed and/or uncompressed content. The content can be encrypted and/or unencrypted. Other types of content are possible as well.

As another example, server device 1708 and/or cloud device 1710 can provide programmable devices 1704a-1704f with access to software for database, search, software configuration, computation, graphical, audio, video, World Wide Web/Internet utilization, and/or other functions. Many other examples of server devices are possible as well.

Computing Device Architecture

Figure 18A:
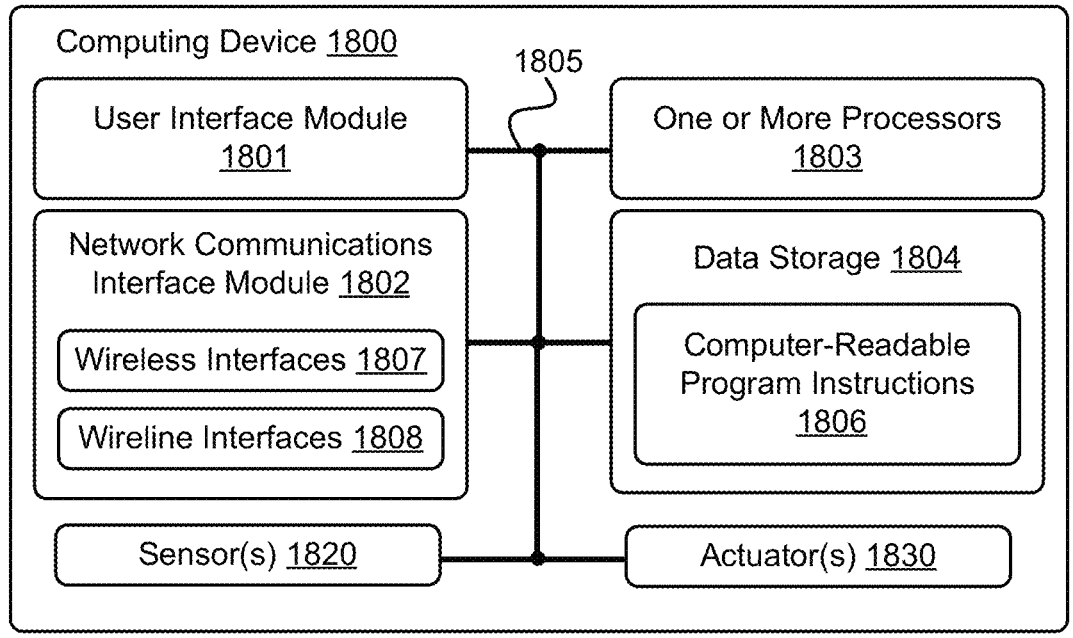
FIG. 18A is a functional block diagram of an example computing device, in accordance with an example embodiment.

FIG. 18A is a functional block diagram of an example computing device 1800, in accordance with an example embodiment. In particular, computing device 1800 shown in FIG. 18A can be configured to perform at least one function related to: computing devices 110, 1400, robot ordering system 120, system bar 132, robot configuration software 1420, a robotic device, scenarios 100, 100a, 1600, and/or methods 1500, 1900, 2000. Computing device 1800 may include a user interface module 1801, a network-communication interface module 1802, one or more processors 1803, data storage 1804, one or more sensors 1820, and one or more actuators 1830, all of which may be linked together via a system bus, network, or other connection mechanism 1805.

User interface module 1801 can be operable to send data to and/or receive data from external user input/output devices. For example, user interface module 1801 can be configured to send and/or receive data to and/or from user input devices such as a keyboard, a keypad, a touch screen, a computer mouse, a track ball, a joystick, a camera, a voice recognition module, and/or other similar devices. User interface module 1801 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1801 can also be configured to generate audible output(s), such as a speaker, speaker jack, audio output port, audio output device, earphones, and/or other similar devices.

Network-communications interface module 1802 can include one or more wireless interfaces 1807 and/or one or more wireline interfaces 1808 that are configurable to communicate via a network. Wireless interfaces 1807 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 1808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1802 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 1803 can include one or more general purpose processors, and/or one or more special purpose processors (e.g., digital signal processors, graphics processing units, application specific integrated circuits, etc.). One or more processors 1803 can be configured to execute computer-readable program instructions 1806 that are contained in the data storage 1804 and/or other instructions as described herein.

Data storage 1804 can include one or more computer-readable storage media that can be read and/or accessed by at least one of processors 1803. The one or more computer-readable storage media can include volatile and/or non-volatile storage components, such as optical, magnetic, organic or other memory or disc storage, which can be integrated in whole or in part with at least one of one or more processors 1803. In some embodiments, data storage 1804 can be implemented using a single physical device (e.g., one optical, magnetic, organic or other memory or disc storage unit), while in other embodiments, data storage 1804 can be implemented using two or more physical devices.

Data storage 1804 can include computer-readable program instructions 1806 and perhaps additional data. In some embodiments, data storage 1804 can additionally include storage required to perform at least part of the herein-described methods, scenarios, and techniques and/or at least part of the functionality of the devices and networks.

In some embodiments, computing device 1800 can include one or more sensors 1820. Sensor(s) 1820 can be configured to measure conditions in an environment for computing device 1800 and provide data about that environment; e.g., environment 100. For example, sensor(s) 1820 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 1800, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 1800, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor, possibly to obtain; and (iv) a force sensor to measure one or more forces (e.g., inertial forces and/or G-forces) acting about the computing device 1800, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 1820 are possible as well.

Computing device 1800 can include one or more actuators 1830 that enable computing device 1800 to initiate movement. For example, actuator(s) 1830 can include or be incorporated with robotic joints connecting robotic limbs to a robotic body. For example, actuator(s) 1830 can include respective robotic hip and robotic shoulder joints connecting respective robotic legs and arms to the robotic body. Further, the actuator(s) 1830 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 1830 can include respective robotic ankle joints connecting the robotic legs to robotic feet and respective robotic wrist joints connecting the robotic arms to robotic hands. In addition, actuator(s) 1830 can include motors for moving the robotic limbs. As such, the actuator(s) 1830 can enable mobility of computing device 1800. Other examples of actuator(s) 1830 are possible as well.

Cloud-Based Servers

Figure 18B:
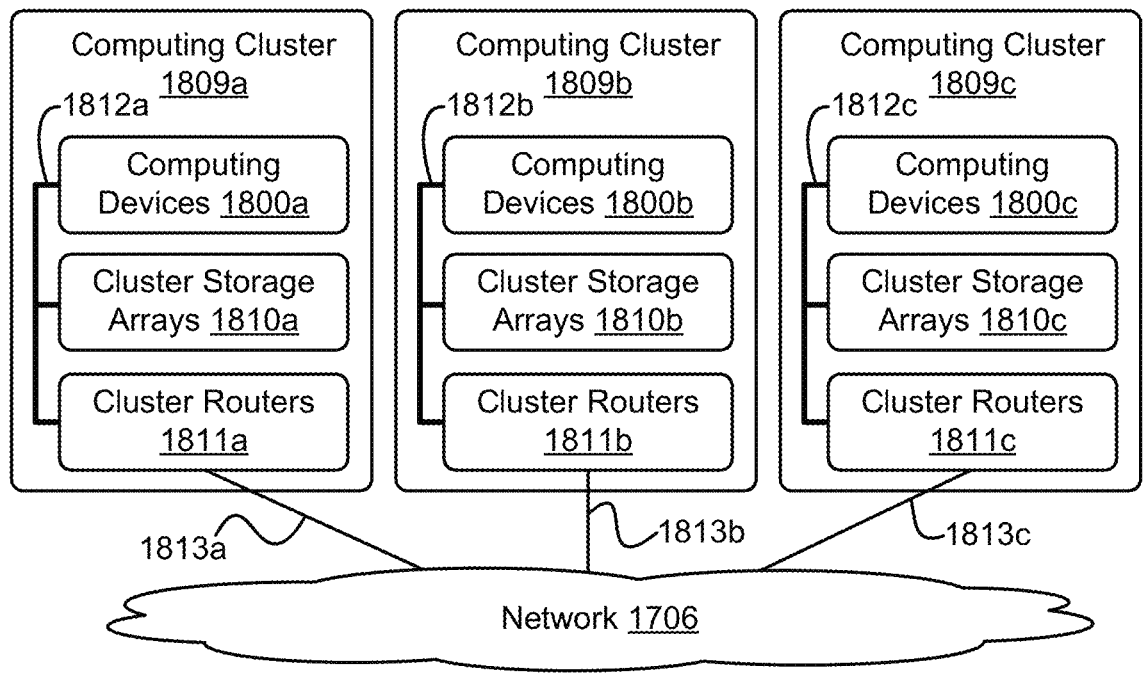
FIG. 18B depicts a network of computing clusters arranged as a cloud-based server system, in accordance with an example embodiment.

FIG. 18B depicts a network of computing clusters arranged as a cloud-based server system, in accordance with an example embodiment. FIG. 18B depicts a network 1706 of computing clusters 1809a, 1809b, 1809c arranged as a cloud-based server system in accordance with an example embodiment. Computing clusters 1809a, 1809b, 1809c can be cloud-based devices that store program logic and/or data of cloud-based applications and/or services; e.g., perform at least one function related to: computing devices 110, 1400, robot ordering system 120, system bar 132, robot configuration software 1420, a robotic device, scenarios 100, 100a, 1600, and/or methods 1500, 1900, 2000.

In some embodiments, computing clusters 1809a, 1809b, 1809c can be a single computing device residing in a single computing center. In other embodiments, computing clusters 1809a, 1809b, 1809c can include multiple computing devices in a single computing center, or even multiple computing devices located in multiple computing centers located in diverse geographic locations. For example, FIG. 18B depicts each of computing clusters 1809a, 1809b, 1809c residing in different physical locations.

In some embodiments, data and services at computing clusters 1809a, 1809b, 1809c can be encoded as computer readable information stored in non-transitory, tangible computer readable media (or computer readable storage media) and accessible by other computing devices. In some embodiments, computing clusters 1809a, 1809b, 1809c can be stored on a single disk drive or other tangible storage media, or can be implemented on multiple disk drives or other tangible storage media located at one or more diverse geographic locations.

FIG. 18B depicts a cloud-based server system in accordance with an example embodiment. In FIG. 18B, functionality of a computing device and/or a robotic device can be distributed among three computing clusters 1809a, 1809b, and 1809c. Computing cluster 1809a can include one or more computing devices 1800a, cluster storage arrays 1810a, and cluster routers 1811a connected by a local cluster network 1812a. Similarly, computing cluster 1809b can include one or more computing devices 1800b, cluster storage arrays 1810b, and cluster routers 1811b connected by a local cluster network 1812b. Likewise, computing cluster 1809c can include one or more computing devices 1800c, cluster storage arrays 1810c, and cluster routers 1811c connected by a local cluster network 1812c.

In some embodiments, each of the computing clusters 1809a, 1809b, and 1809c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1809a, for example, computing devices 1800a can be configured to perform various computing tasks of a computing device and/or a robotic device. In one embodiment, the various functionalities of a computing device and/or a robotic device can be distributed among one or more computing devices 1800a, 1800b, and 1800c. Computing devices 1800b and 1800c in respective computing clusters 1809b and 1809c can be configured similarly to computing devices 1800a in computing cluster 1809a. On the other hand, in some embodiments, computing devices 1800a, 1800b, and 1800c can be configured to perform different functions.

In some embodiments, computing tasks and stored data associated with a computing device and/or a robotic device can be distributed across computing devices 1800a, 1800b, and 1800c based at least in part on the processing requirements of a computing device and/or a robotic device, the processing capabilities of computing devices 1800a, 1800b, and 1800c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1810a, 1810b, and 1810c of the computing clusters 1809a, 1809b, and 1809c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a computing device and/or a robotic device can be distributed across computing devices 1800a, 1800b, and 1800c of computing clusters 1809a, 1809b, and 1809c, various active portions and/or backup portions of these components can be distributed across cluster storage arrays 1810a, 1810b, and 1810c. For example, some cluster storage arrays can be configured to store one portion of the data of a computing device and/or a robotic device can, while other cluster storage arrays can store other portion(s) of data of a computing device and/or a robotic device. Additionally, some cluster storage arrays can be configured to store backup versions of data stored in other cluster storage arrays.

The cluster routers 1811a, 1811b, and 1811c in computing clusters 1809a, 1809b, and 1809c can include networking equipment configured to provide internal and external communications for the computing clusters. For example, the cluster routers 1811a in computing cluster 1809a can include one or more internet switching and routing devices configured to provide (i) local area network communications between the computing devices 1800a and the cluster storage arrays 1810a via the local cluster network 1812a, and (ii) wide area network communications between the computing cluster 1809a and the computing clusters 1809b and 1809c via the wide area network connection 1813a to network 1706. Cluster routers 1811b and 1811c can include network equipment similar to the cluster routers 1811a, and cluster routers 1811b and 1811c can perform similar networking functions for computing clusters 1809b and 1809b that cluster routers 1811a perform for computing cluster 1809a.

In some embodiments, the configuration of the cluster routers 1811a, 1811b, and 1811c can be based at least in part on the data communication requirements of the computing devices and cluster storage arrays, the data communications capabilities of the network equipment in the cluster routers 1811a, 1811b, and 1811c, the latency and throughput of local networks 1812a, 1812b, 1812c, the latency, throughput, and cost of wide area network links 1813a, 1813b, and 1813c, and/or other factors that can contribute to the cost, speed, fault-tolerance, resiliency, efficiency and/or other design goals of the moderation system architecture.

Example Methods of Operation

FIG. 19 is a flowchart of method 1900, in accordance with an example embodiment. Method 1900 can be executed by a computing device, such as computing device 1800 discussed above.

Method 1900 can begin at block 1910, where the computing device can receive a configuration request for a robotic device. The configuration request can include environmental information and task information for one or more tasks requested to be performed by the robotic device in an environment, such as discussed above at least in the context of FIGS. 6 and 14-16. In some embodiments, the information about the environment can include a three-dimensional environment, such as discussed above at least in the context of FIGS. 6 and 14.

At block 1920, the computing device can determine one or more task-associated regions in the environment for the one or more tasks, where a task-associated region for a given task of the one or more tasks includes a region of the environment that the robotic device is expected to reach while performing the given task in the environment, such as discussed above at least in the context of FIG. 14. In embodiments where information about the environment specifies a three-dimensional environment, the computing device can determine one or more task-associated volumes in the environment for the one or more tasks, where a task-associated volume for a given task of the one or more tasks includes a volume of the environment that the robotic device is expected to reach while performing the given task in the environment, such as discussed above at least in the context of FIG. 14.

At block 1930, the computing device can, based at least in part on the one or more task-associated regions determined for the one or more tasks, determine respective dimensions of one or more components of the robotic device and an arrangement for assembling the one or more components into the robotic device so that the robotic device is configured to perform at least one task of the one or more tasks in the environment, such as discussed above at least in the context of FIGS. 14-16. In embodiments where information about the environment specifies a three-dimensional environment, the computing device can, based at least in part on one or more task-associated volumes determined for the one or more tasks, determine respective dimensions of one or more components of the robotic device and an arrangement for assembling the one or more components into the robotic device so that the robotic device is configured to perform at least one task of the one or more tasks in the environment, such as discussed above at least in the context of FIGS. 14-16.

In some embodiments, determining the respective dimensions of one or more components of the robotic device and the arrangement for assembling the one or more components can include: determining one or more ranges of motion associated with the one or more tasks; determining a first set of components for the robotic device that are expected to have the one or more ranges of motion; and determining a first arrangement for the robotic device for assembling the first set of components into the robotic device that is expected to have the one or more ranges of motion, such as discussed above at least in the context of FIGS. 14-16. In particular of these embodiments, determining the first set of components for the robotic device can include: determining an initial set of components that are expected to have the one or more ranges of motion; determining one or more criteria associated with a first component of the initial set of components, where the first component has a first range of motion; determining a replacement component that has the first range of motion; determining whether the replacement component is to replace the first component based on the one or more criteria; and after determining that the replacement component is to replace the first component, replacing the first component in the initial set of components with the replacement component, such as discussed above at least in the context of FIGS. 14-16. In even more particular of these embodiments, the one or more criteria can include at least one of: a cost criterion, a weight criterion, a size criterion, and a component-availability criterion, such as discussed above at least in the context of FIGS. 14-16.

In other embodiments, determining the respective dimensions of one or more components of the robotic device and the arrangement for assembling the one or more components can include: determining one or more measures of manipulability associated with the one or more tasks; determining a second set of components for the robotic device that are expected to have the one or more measures of manipulability; and determining a second arrangement for the robotic device for assembling the second set of components into the robotic device that is e expected to have the one or more measures of manipulability, such as discussed above at least in the context of FIGS. 14-16.

At block 1940, the computing device can provide a configuration for the robotic device, where the configuration includes the respectively determined dimensions and the determined arrangement, such as discussed above at least in the context of FIGS. 6 and 14-16. In some embodiments, providing the configuration can include providing a plurality of configurations for the robotic device, where the request to construct the robotic device includes a selection of one or more configurations out of the plurality of configurations, such as discussed above at least in the context of FIGS. 6 and 13-16.

In some embodiments, providing the configuration can include providing one or more images related to the configuration, such as discussed above at least in the context of FIGS. 10-12 and 14-16. In particular of these embodiments, the one or more images can include one or more images of a simulation of the robotic device performing at least one task of the one or more tasks in the environment, such as discussed above at least in the context of FIGS. 10 and 14-16. In other particular of these embodiments, the one or more images can include one or more images related to a range of motion of at least a portion of the robotic device, such as discussed above at least in the context of FIGS. 12 and 14-16.

In other embodiments, providing the configuration for the robotic device can include: determining an initial configuration of the robotic device so that the robotic device performs at least one task of the one or more tasks in the environment; determining whether the initial configuration of the robotic device is expected to perform all of the one or more tasks; and after determining that the initial configuration of the robotic device is expected to perform all of the one or more tasks, determining that the configuration for the robotic device is the initial configuration, such as discussed above at least in the context of FIGS. 14-16. In particular of these embodiments, method 1900 can additionally include: after determining that the initial configuration of the robotic device is not expected to perform all of the one or more tasks, modifying the initial configuration so that the robotic device is expected to perform all of the one or more tasks, such as discussed above at least in the context of FIGS. 14-16.

In yet other embodiments, providing the configuration for the robotic device can include: determining one or more constraints related to the environment and/or one or more tasks; determining whether a particular configuration for the robotic device satisfies the one or more constraints; and after determining whether the particular configuration for the robotic device satisfies the one or more constraints, determining that the particular configuration for the robotic device is the configuration for the robotic device, such as discussed above at least in the context of FIGS. 14-16.

In still other embodiments, providing the configuration for the robotic device can include: determining one or more objectives related to the environment and/or one or more tasks; and determining the configuration for the robotic device based on a configuration score related to the one or more objectives, such as discussed above at least in the context of FIG. 14.

In some embodiments, method 1900 can further include: receiving a request to construct the robotic device based on the configuration for the robotic device; and generating an instruction to construct the robotic device, where the instruction includes the configuration, such as discussed above at least in the context of FIGS. 13-16. In particular of these embodiments, providing the configuration can include providing a plurality of configurations for the robotic device, and the request to construct the robotic device can include a selection of one or more configurations out of the plurality of configurations, such as discussed above at least in the context of FIGS. 13-16. In other particular of these embodiments, the request to construct the robotic device can include one or more selections of one or more components of the robotic device, such as discussed above at least in the context of FIGS. 13-16.

FIG. 20 is a flowchart of method 2000, in accordance with an example embodiment. Method 2000 can be executed by a computing device, such as computing device 1800 discussed above. Method 2000 can begin at block 2010, where a user interface of the computing device can receive a query related to a configuration request, where the query includes environmental information and task information for one or more tasks requested to be performed by a robotic device in the environment, such as discussed above in the context of at least FIGS. 1-5 and 16.

At block 2020, the computing device can generate the configuration request for the robotic device, where the configuration request includes the environmental information and the task information, such as discussed above in the context of at least FIGS. 6 and 16.

At block 2030, the computing device can provide the configuration request for the robotic device, such as discussed above in the context of at least FIGS. 6 and 16.

At block 2040, the computing device can, after providing the request, receive a configuration for the robotic device, where the configuration includes respective dimensions of one or more components of the robotic device and an arrangement for assembling the one or more components into the robotic device so that the robotic device is configured to perform at least one task of the one or more tasks in the environment, such as discussed above in the context of at least FIGS. 6 and 16.

In some embodiments, receiving the configuration for the robotic device can include: receiving one or more configurations of the robotic device; and receiving construction-related input requesting construction of the robotic device based on one or more configurations for the robotic device via the user interface. Then, providing the output related to the received configuration can include: generating a request to construct the robotic device based on the construction-related input; and providing the request to construct the robotic device, such as discussed above in the context of at least FIGS. 6-13 and 16. In particular of these embodiments, receiving the one or more configurations can include receiving a plurality of configurations of the robotic device, where the construction-related input includes a selection of one or more configurations out of the plurality of configurations, such as discussed above in the context of at least FIGS. 6, 12, and 16. In other particular of these embodiments, the construction-related input can include a selection of one or more components of the robotic device, such as discussed above in the context of at least FIGS. 12 and 16.

At block 2050, the computing device can provide an output related to the received configuration, such as discussed above in the context of at least FIGS. 6-12, 15, and 16. In some embodiments, the output can include: a display related to the received configuration using the computing device, such as discussed above in the context of at least FIGS. 6-12. In particular of these embodiments, the display related to the received configuration can include one or more images of a simulation of the robotic device performing at least one task of the one or more tasks in the environment and one or more images related to a range of motion of at least a portion of the robotic device, such as discussed above in the context of at least FIGS. 10, 12, and 16.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
receiving, via a user interface of a computing device, a query related to a configuration request, wherein the query includes environmental information, task information for a plurality of tasks requested to be performed by a robotic device in a first environment, and prioritizations for each of the plurality of tasks, wherein a prioritization for a given task indicates a likelihood that the robotic device will perform the given task in the first environment;
determining operability scores for each of a plurality of task-associated regions in the first environment, wherein an operability score for a given task-associated region indicates a likelihood that the robotic device will operate in the given task-associated region while performing the plurality of tasks;
generating the configuration request for the robotic device, wherein the configuration request comprises the environmental information, the task information, the prioritizations, and the operability scores;
providing the configuration request for the robotic device;
after providing the configuration request, receiving a configuration for the robotic device, wherein the configuration comprises respective dimensions of one or more components of the robotic device and an arrangement for assembling the one or more components into the robotic device so that the robotic device is configured to perform at least one task of the plurality of tasks in the first environment, wherein the configuration for the robotic device is selected based on the operability scores determined for each of the plurality of task-associated regions in the first environment;
providing, via the user interface of the computing device, an output related to the received configuration; and
constructing the robotic device having the received configuration.

2. The method of claim 1, wherein the operability score for the given task-associated region is based on the prioritization for each task of the plurality of tasks that is performed in the given task-associated region.

3. The method of claim 1, wherein the query further includes one or more constraints related to the first environment or the plurality of tasks, and wherein the respective dimensions of one or more components of the robotic device and an arrangement for assembling the one or more components into the robotic device satisfy at least one of the one or more constraints.

4. The method of claim 3, wherein the one or more constraints include at least one of: a weight constraint, a horizontal reach constraint, a cost constraint, or a power usage constraint.

5. The method claim 3, further comprising:
determining whether the received configuration for the robotic device satisfies all of the one or more constraints; and
after determining that the configuration does not satisfy all of the one or more constraints, providing, via the user interface, an option to modify the query.

6. The method of claim 1, wherein providing the output related to the received configuration comprises providing one or more images related to the configuration, and wherein the one or more images comprise one or more images of a simulation of the robotic device performing at least one task of the plurality tasks in the first environment.

7. The method of claim 1, wherein the one or more images comprise one or more images related to a range of motion of at least a portion of the robotic device.

8. The method of claim 1, further comprising:
receiving, via the user interface, construction-related input requesting construction of the robotic device, wherein providing the output related to the received configuration comprises:
generating a request to construct the robotic device based on the construction-related input; and
providing the request to construct the robotic device.

9. The method of claim 8, wherein receiving the configuration comprises receiving a plurality of configurations of the robotic device, and wherein the construction-related input comprises a user selection of the configuration out of the plurality of configurations.

10. The method of claim 1, wherein the query further includes task information for a second plurality of tasks requested to be performed by the robotic device in a second environment, wherein the configuration request further comprises the task information for the second plurality of tasks, and wherein the arrangement for assembling the one or more components is such that the robotic device is configured to perform at least one task of the plurality of second tasks in the second environment.

11. The method of claim 10, wherein the plurality of tasks is the second plurality of tasks.

12. The method of claim 10, wherein the configuration request further comprises rankings for the first environment and the second environment, wherein a ranking for a given environment indicates a likelihood that the robotic device will operate in the given environment.

13. The method of claim 1, wherein the computing device is configured to display, via the user interface, information about tasks from the plurality of tasks that can be performed by the robotic device when assembled using the received configuration and tasks from the plurality of tasks that cannot be performed by the robotic device when assembled using the received configuration.

14. The method of claim 1, wherein the environmental information comprises information about a three-dimensional environment.

15. The method of claim 14, wherein the information about the three-dimensional environment is specified by adding, via the user interface, a plurality of three-dimensional items to a default environment, the plurality of three-dimensional items thereby forming the three-dimensional environment.

16. The method of claim 1, further comprising displaying, via the user interface, a manipulability graph, wherein the manipulability graph comprises a first axis corresponding to a horizontal distance from the robotic device and a second axis corresponding to a vertical distance from the robotic device, and wherein each point of the manipulability graph indicates an ability of the robotic device, when assembled using the received configuration, to move to and/or apply forces at the point.

17. The method of claim 16, wherein the horizontal distance and the vertical distance are computed with respect to an end of an arm component of the received configuration.

18. A computing device, comprising:
one or more processors; and
data storage including at least computer-executable instructions stored thereon that, when executed by the one or more processors, cause the computing device to perform functions comprising:
receiving, via a user interface of the computing device, a query related to a configuration request, wherein the query includes environmental information, task information for a plurality of tasks requested to be performed by a robotic device in a first environment, and prioritizations for each of the plurality of tasks, wherein a prioritization for a given task indicates a likelihood that the robotic device will perform the given task in the first environment;
determining operability scores for each of a plurality of task-associated regions in the first environment, wherein an operability score for a given task-associated region indicates a likelihood that the robotic device will operate in the given task-associated region while performing the plurality of tasks;
generating the configuration request for the robotic device, wherein the configuration request comprises the environmental information, the task information, the prioritizations, and the operability scores;
providing the configuration request for the robotic device;
after providing the configuration request, receiving a configuration for the robotic device, wherein the configuration comprises respective dimensions of one or more components of the robotic device and an arrangement for assembling the one or more components into the robotic device so that the robotic device is configured to perform at least one task of the plurality of tasks in the first environment, wherein the configuration for the robotic device is selected based on the operability scores determined for each of the plurality of task-associated regions in the first environment;
providing, via the user interface of the computing device, an output related to the received configuration; and
constructing the robotic device having the received configuration.

19. A non-transitory computer readable medium having stored thereon instructions, that when executed by one or more processors of a computing device, cause the computing device to perform functions comprising:
receiving, via a user interface of the computing device, a query related to a configuration request, wherein the query includes environmental information, task information for a plurality of tasks requested to be performed by a robotic device in a first environment, and prioritizations for each of the plurality of tasks, wherein a prioritization for a given task indicates a likelihood that the robotic device will perform the given task in the first environment;

determining operability scores for each of a plurality of task-associated regions in the first environment, wherein an operability score for a given task-associated region indicates a likelihood that the robotic device will operate in the given task-associated region while performing the plurality of tasks;

generating the configuration request for the robotic device, wherein the configuration request comprises the environmental information, the task information, and the prioritizations, and the operability scores;

providing the configuration request for the robotic device;

after providing the configuration request, receiving a configuration for the robotic device, wherein the configuration comprises respective dimensions of one or more components of the robotic device and an arrangement for assembling the one or more components into the robotic device so that the robotic device is configured to perform at least one task of the plurality of tasks in the first environment, wherein the configuration for the robotic device is selected based on the operability scores determined for each of the plurality of task-associated regions in the first environment;

providing, via the user interface of the computing device, an output related to the received configuration; and constructing the robotic device having the received configuration.

* * * * *